US012371092B2

(12) United States Patent
Oono et al.

(10) Patent No.: US 12,371,092 B2
(45) Date of Patent: Jul. 29, 2025

(54) STEERING DEVICE

(71) Applicant: JTEKT CORPORATION, Kariya (JP)

(72) Inventors: Yoshihiro Oono, Katsuragi (JP);
Yasuyuki Nozawa, Kashihara (JP);
Ryoichi Tokioka, Kashiba (JP);
Kunihiro Oka, Kashihara (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/713,361

(22) PCT Filed: Aug. 12, 2022

(86) PCT No.: PCT/JP2022/030735
§ 371 (c)(1),
(2) Date: May 24, 2024

(87) PCT Pub. No.: WO2023/119719
PCT Pub. Date: Jun. 29, 2023

(65) Prior Publication Data
US 2025/0050936 A1    Feb. 13, 2025

(30) Foreign Application Priority Data
Dec. 20, 2021  (WO) .............. PCT/JP2021/047030

(51) Int. Cl.
B62D 1/187        (2006.01)
(52) U.S. Cl.
CPC ................... B62D 1/187 (2013.01)
(58) Field of Classification Search
CPC ..................................... B60R 21/18
See application file for complete search history.

(56) References Cited

U.S. PATENT DOCUMENTS 3,904,254 A * 9/1975 Hagen ............... F16C 29/048
                                                 312/334.47
5,737,971 A   4/1998 Riefe et al.
(Continued)

FOREIGN PATENT DOCUMENTS

CN    116767334 A  *  9/2023  ............ B62D 1/181
DE    10250663 A1  *  5/2004  ......... F16C 29/0697
(Continued)

OTHER PUBLICATIONS

Feb. 15, 2022 International Search Report issued in International Patent Application No. PCT/JP2021/047030.
(Continued)

Primary Examiner — Nicole T Verley
(74) Attorney, Agent, or Firm — Oliff PLC

(57) ABSTRACT

A steering device includes a movable body that rotatably supports a shaft member to which a steering member is attached, and first and second rail mechanisms that guide movement of the movable body in a front-rear direction. The first rail mechanism has a first rolling element row that is disposed between a first raceway face of a first fixed rail and a second raceway face of a first moving rail. The second rail mechanism has a second rolling element row that is between a third raceway face of a second fixed rail and a fourth raceway face of a second moving rail. A contact angle of each of a plurality of first rolling elements with respect to the first and second raceway faces, and the contact angle of each of a plurality of second rolling elements with respect to the third and fourth raceway faces are different from each other.

5 Claims, 13 Drawing Sheets

(56) References Cited

U.S. PATENT DOCUMENTS

| | | | |
|---|---|---|---|
| 2006/0053933 A1 | 3/2006 | Gaeth et al. | |
| 2006/0162989 A1* | 7/2006 | Yamada | B62D 1/185 |
| | | | 280/775 |
| 2013/0341479 A1* | 12/2013 | Yamada | B60N 2/0715 |
| | | | 248/430 |
| 2017/0341678 A1 | 11/2017 | Dekker et al. | |
| 2018/0370559 A1 | 12/2018 | Swamidason | |
| 2019/0016365 A1 | 1/2019 | Swamidason et al. | |
| 2021/0001916 A1 | 1/2021 | Appleyard | |
| 2021/0016820 A1 | 1/2021 | Nozawa et al. | |
| 2021/0171088 A1* | 6/2021 | Hwang | B62D 5/006 |
| 2022/0242474 A1 | 8/2022 | Bayer et al. | |

FOREIGN PATENT DOCUMENTS

| | | | | |
|---|---|---|---|---|
| EP | 1803949 B1 * | 12/2013 | | F16C 29/04 |
| EP | 3631219 B1 * | 6/2021 | | B62D 1/16 |
| JP | 2014015110 A * | 1/2014 | | |
| JP | 2018079851 A * | 5/2018 | | |
| JP | 2020-131958 A | 8/2020 | | |
| JP | 2021-046001 A | 3/2021 | | |
| KR | 20230015017 A * | 7/2021 | | |
| WO | WO-2008133266 A1 * | 11/2008 | | B60R 3/02 |
| WO | 2019/005736 A1 | 1/2019 | | |
| WO | 2019/193956 A1 | 10/2019 | | |
| WO | 2020/234224 A1 | 11/2020 | | |
| WO | WO-2023119744 A1 * | 6/2023 | | B62D 1/181 |
| WO | WO-2023148855 A1 * | 8/2023 | | B62D 1/183 |
| WO | WO-2024051877 A1 * | 3/2024 | | |

OTHER PUBLICATIONS

Sep. 6, 2022 International Search Report issued in International Patent Application No. PCT/JP2022/030735.

Mar. 3, 2025 Extended European Search Report issued in European Patent Application No. 22910447.6.

* cited by examiner

STEERING DEVICE

TECHNICAL FIELD

The present invention relates to a steering device that can broaden space in front of a driver, by moving a steering member such as a steering wheel or the like.

BACKGROUND ART

In a state of automated driving level 4 or higher, in which the system is responsible for automated driving of a vehicle, the driver does not need to hold the steering wheel, since he/she does not need to be responsible for operating the vehicle. Accordingly, moving the steering wheel during automated driving so that a broad space can be secured in front of the driver can improve comfort or safety for the driver. For example, Patent Document 1 discloses a steering device including a housing that rotatably supports a steering wheel, an arm that extends in a lateral direction (width direction of vehicle) from a housing, and two rails that are arrayed in an up-down direction and that support the arm so as to be capable of movement in a front-rear direction. In this steering device, the arm moves in the front-rear direction of the vehicle along the two rails situated on a left side of the housing. Thus, the steering wheel that is supported by the housing moves between a position at which the driver operates the steering wheel, and a position that is forward therefrom.

RELATED ART DOCUMENTS

Patent Documents

Patent Document 1: US Patent Application Publication No. 2019/0016365
Patent Document 2: WO2019/193956

SUMMARY OF THE INVENTION

Problem to be Solved by the Invention

In a steering device, in order to stably support a steering wheel (steering member), a structure that supports the steering wheel is required to have relatively high rigidity. In comparison with this, in the conventional steering device described in Patent Document 1, the steering wheel is supported by the housing via a column shaft, and the housing is supported by two rails situated to the side of the housing, via the arm extending to the side from the housing. Accordingly, in a case in which a load in the up-down direction is applied to the steering wheel, for example, there is a possibility of a relatively large rotational moment acting on the two rails. In other words, there is a possibility that the structure of this steering device will lack rigidity (supporting rigidity) for stable support of the steering wheel.

The present invention has been achieved by the inventors of the present application newly taking note of the above problem, and an object thereof is to provide a steering device that can broaden space in front of a driver and also can stably support a steering member.

Means for Solving the Problem

In order to achieve the above object, a steering device according to one aspect of the present invention is a steering device for performing steering of a vehicle, and includes a steering input shaft to which a steering member is attached, a movable body that rotatably supports the steering input shaft, and a first rail mechanism and a second rail mechanism that guide movement of the movable body in a front-rear direction of the vehicle, the first rail mechanism and the second rail mechanism being disposed at different positions from each other, in which the first rail mechanism includes a first fixed rail that is fixed to the vehicle and that has a first raceway face, a first moving rail that is slidably attached to the first fixed rail, and that has a second raceway face, and also that is attached to the movable body, and a first rolling element row that is disposed between the first raceway face and the second raceway face, the first rolling element row including a plurality of first rolling elements that are capable of rolling, the second rail mechanism includes a second fixed rail that is fixed to the vehicle and that has a third raceway face, a second moving rail that is slidably attached to the second fixed rail, and that has a fourth raceway face, and also that is attached to the movable body, and a second rolling element row that is disposed between the third raceway face and the fourth raceway face, the second rolling element row including a plurality of second rolling elements that are capable of rolling, and a contact angle of each of the plurality of first rolling elements with respect to the first raceway face and the second raceway face, and a contact angle of each of the plurality of second rolling elements with respect to the third raceway face and the fourth raceway face, are different from each other.

Effects of the Invention

According to the present invention, a steering device that can broaden space in front of the driver and also can stably support the steering member can be provided.

MODES FOR CARRYING OUT THE INVENTION

Embodiments (including modifications) of a steering device according to the present invention will be described below in detail with reference to the drawings. Note that the embodiment described below illustrates an inclusive or specific example. Numerical values, shapes, materials, components, layout positions and connection forms of the components, steps and order of the steps, and so forth, which are illustrated in the following embodiment, are examples and do not limit the present invention.

There are cases in which the drawings are schematic illustrations with exaggerations, omissions, and adjustments of proportions being made as appropriate for illustrating the present invention, and accordingly, the drawings may differ from actual shapes, positional relations, and proportions. Furthermore, expressions indicating relative directions or orientations, such as parallel, orthogonal, and so forth, may be used in the following embodiment, but these expressions also include cases in which the directions or orientations are not strictly so. For example, to say that two directions are parallel does not only mean that the two directions are completely parallel, but also means that they are substantially parallel, i.e., including a difference of, for example, around a few percent.

Embodiment

1. Configuration Overview of Steering System

Figure 1:
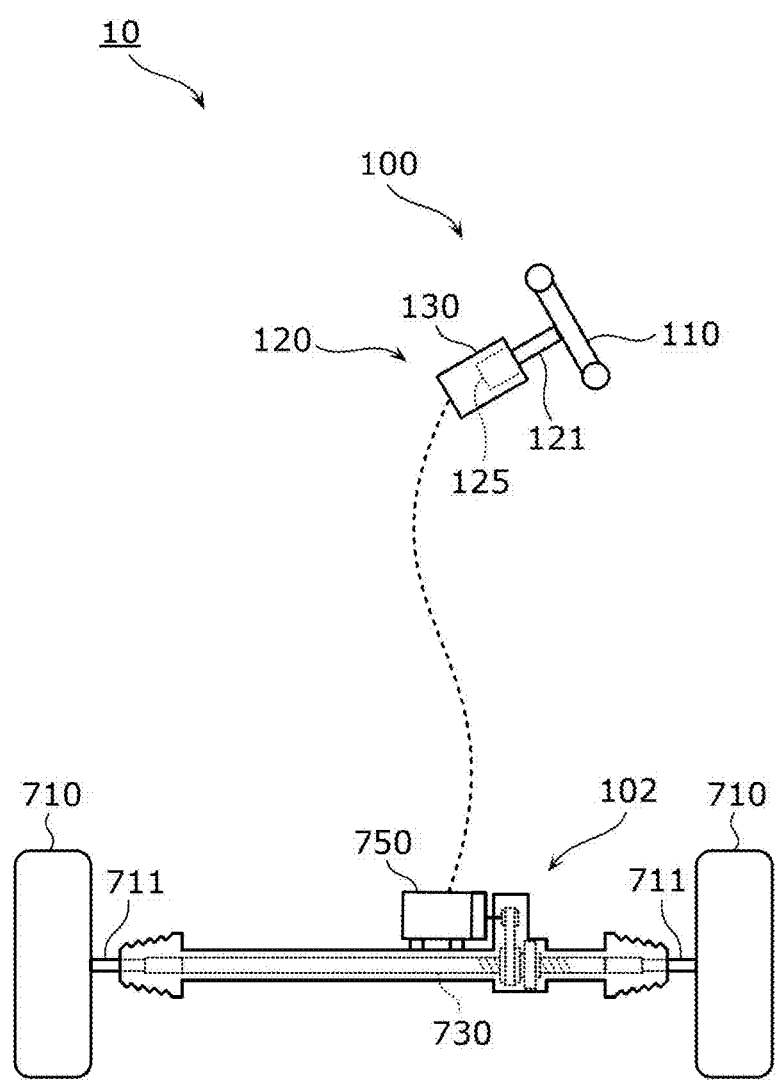
FIG. 1 is a schematic diagram illustrating a configuration overview of a steering system according to an embodiment.

First, with reference to FIG. 1, a configuration overview of a steering system 10 including a steering device 100 according to the present embodiment will be described. FIG. 1 is a schematic diagram illustrating a configuration overview of the steering system 10 according to the embodiment.

The steering system 10 according to the present embodiment is a device that is installed in a vehicle such as a passenger car, a bus, a truck, a construction machine, an agricultural machine, or the like, which is capable of switching between a manual driving mode and an automated driving mode, for example.

As illustrated in FIG. 1, the steering system 10 includes the steering device 100 that has a steering member 110 operated by a driver, and a steering operation mechanism unit 102 that steers steered wheels 710. The steering system 10 is a system that, for example, in the manual driving mode, reads a rotational angle or the like of the steering member 110 using a sensor or the like, and steers the steered wheels 710 by reciprocal motion of a shaft body 730 in a right-left direction, based on signals from the sensor or the like. Such a system is called, for example, a SBW (Steer By Wire) system.

In the steering system 10, the steering device 100 is located on an upstream side in actions and processing related to steering of the vehicle, at which the steering member 110 is attached to a shaft member 121, which is an example of a steering input shaft, and the shaft member 121 is rotatably supported by a movable body 130. The movable body 130 is equipped with a reaction force generation device 125, and rotational driving force from the reaction force generation device 125 acts on the shaft member 121. Accordingly, a reaction force, of the driver operating the steering member 110, is applied to the steering member 110. Also, rotational driving force from the reaction force generation device 125 is also used to synchronize a rotational position of the steering member 110 with a steered angle of the steered wheels 710.

In the steering operation mechanism unit 102 situated downstream of the steering device 100, the steered wheels 710 that are connected to the shaft body 730 via tie rods 711 are turned by motion of the shaft body 730 in a width direction of the vehicle (right-left direction in FIG. 1). Specifically, in the manual driving mode, a steering actuator 750 performs actions based on signals indicating the rotational angle of the steering member 110 and so forth, transmitted from the steering device 100. Accordingly, the shaft body 730 moves in the width direction of the vehicle, and the steered wheels 710 are steered. That is to say, the steered wheels 710 are steered in accordance with the operation of the steering member 110. In the automated driving mode, the steering actuator 750 performs actions based on signals or the like, transmitted from a computer (omitted from illustration) for automated driving that is included in the vehicle, and thereby the steered wheels 710 are steered without operation of the steering member 110. Although FIG. 1 illustrates a configuration in which driving force of the steering actuator 750 is transmitted to the shaft body 730 using a belt, the method of transmitting the driving force of the steering actuator 750 to the shaft body 730 is not limited in particular. For example, the driving force of the steering actuator 750 may be transmitted to the shaft body 730 via a pinion gear fixed to a rotational shaft of the steering actuator 750.

2. Basic Configuration of Steering Device

Figure 2:
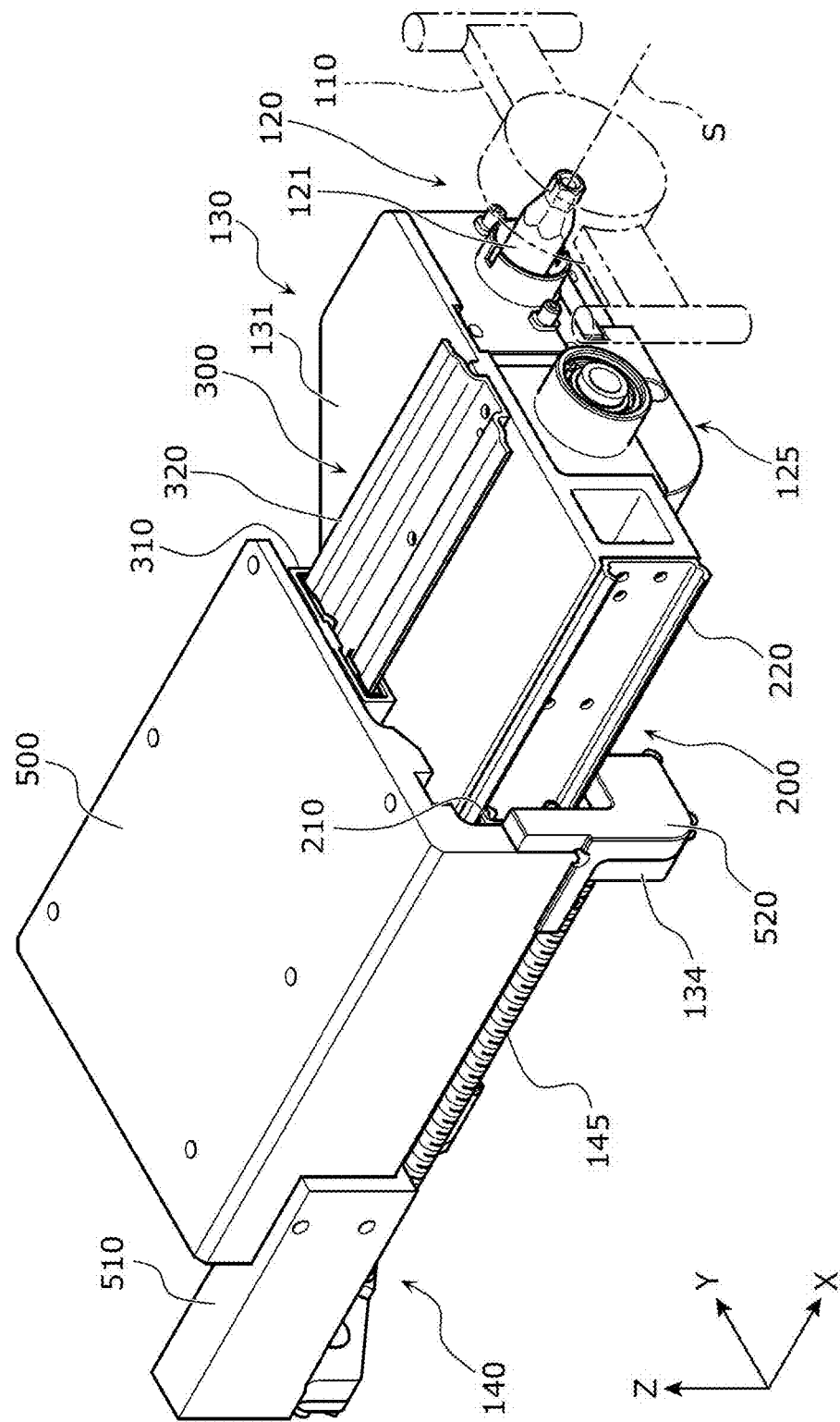
FIG. 2 is a first perspective view illustrating an external view of a steering device according to the embodiment.
Figure 3:
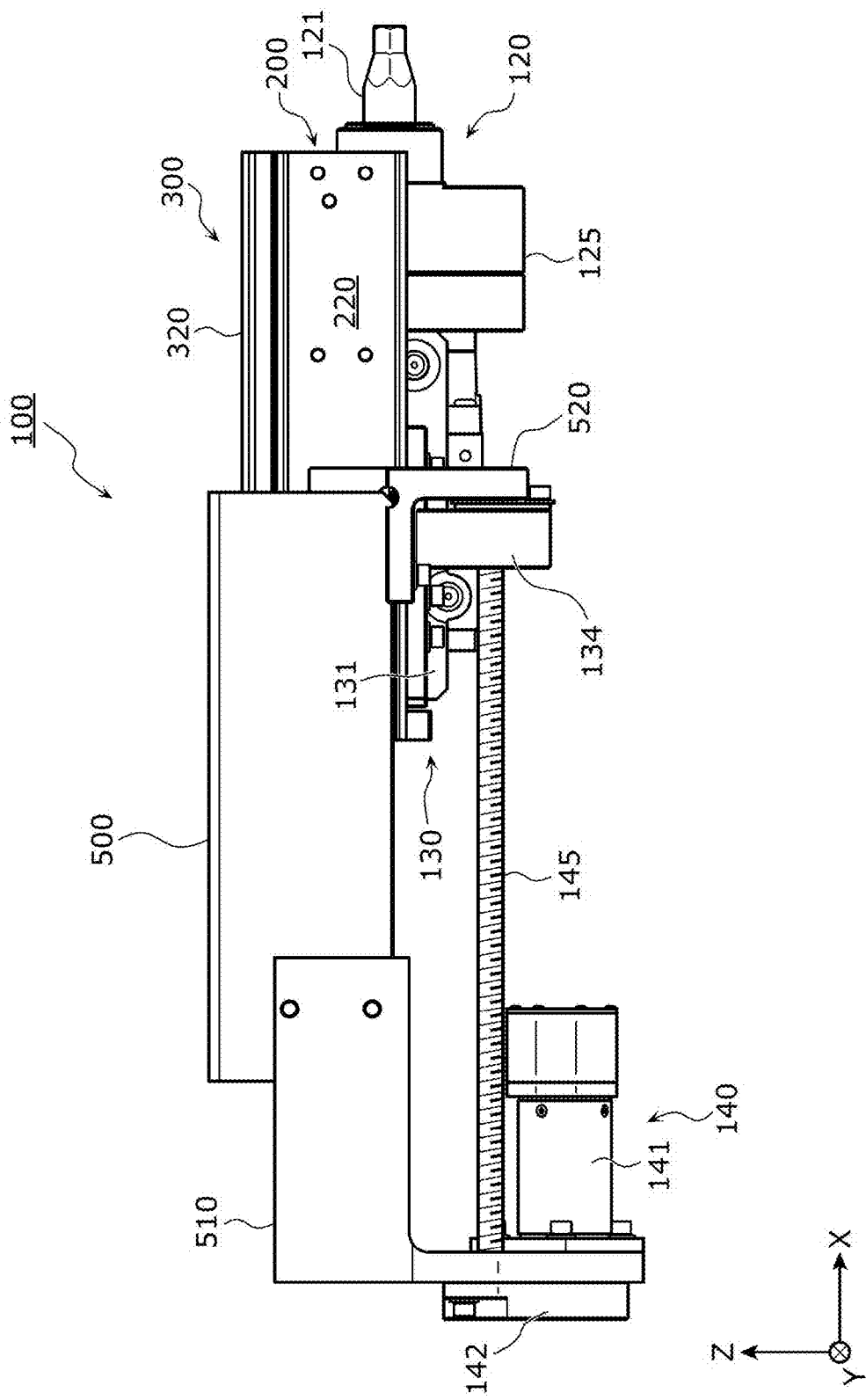
FIG. 3 is a side view of the steering device, corresponding to FIG. 2.
Figure 4:
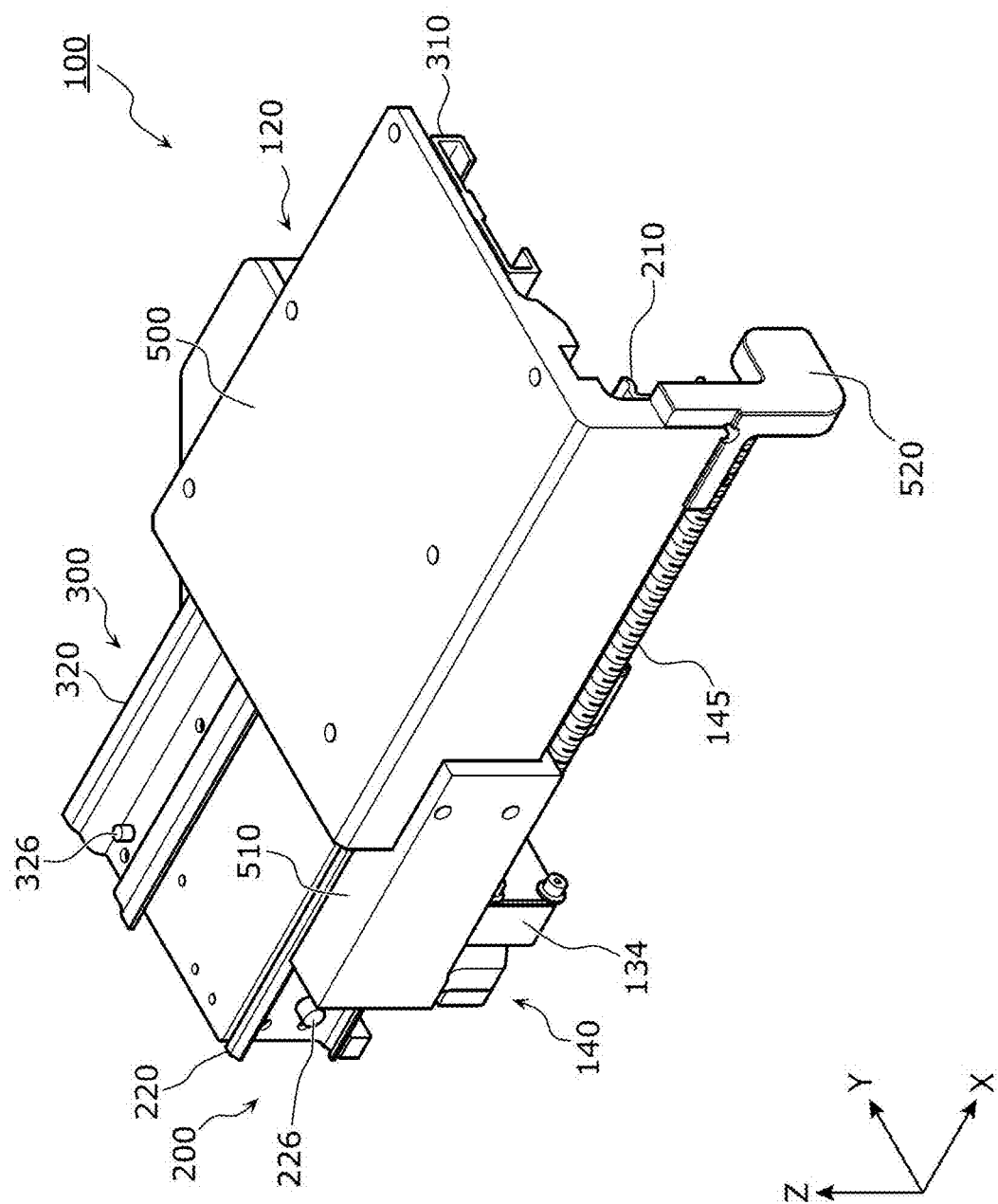
FIG. 4 is a second perspective view illustrating an external view of the steering device according to the embodiment.
Figure 5:
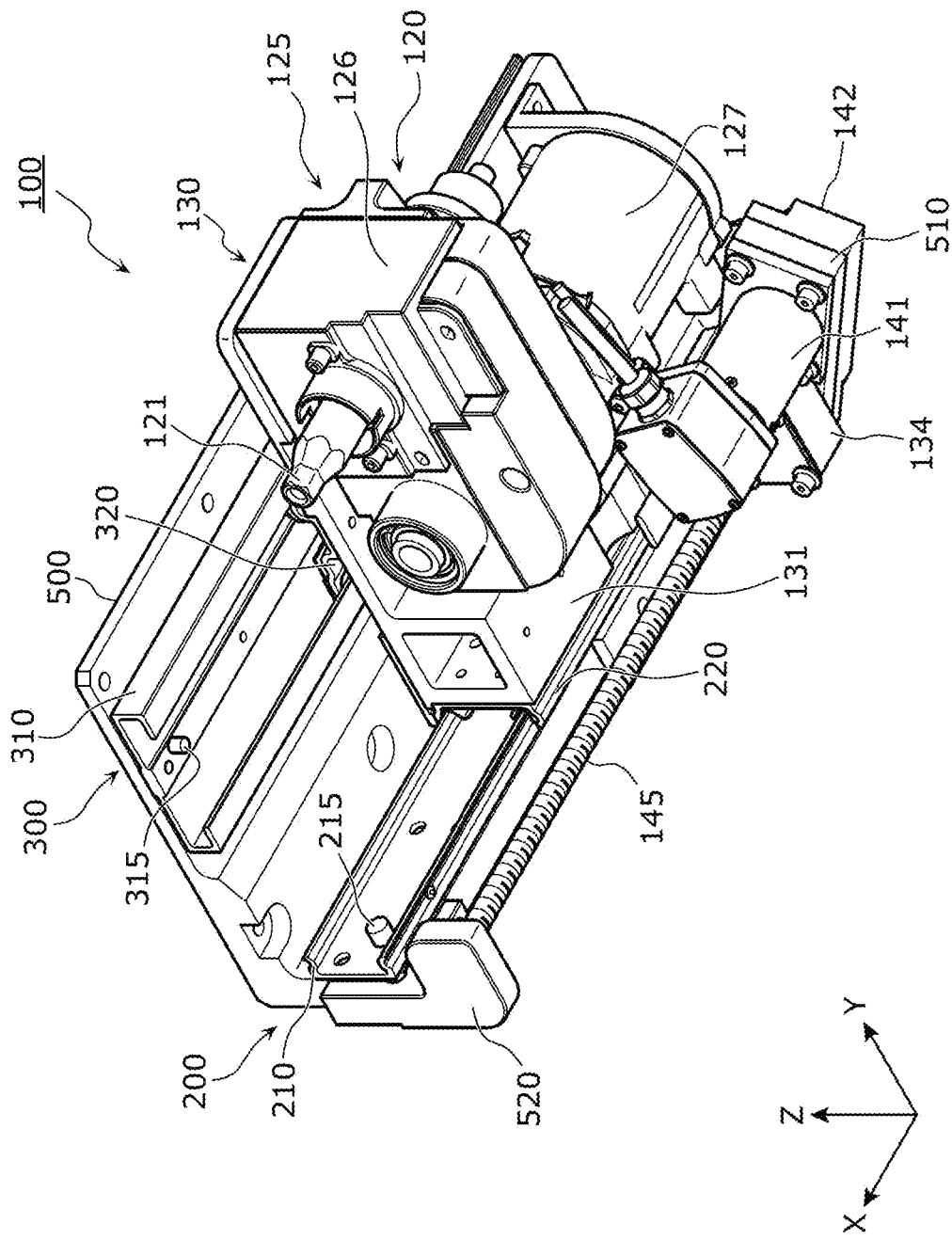
FIG. 5 is a third perspective view illustrating an external view of the steering device according to the embodiment.

Next, a basic configuration of the steering device 100 according to the embodiment will be described with reference to FIG. 2 to FIG. 5. FIG. 2 is a first perspective view illustrating an external view of the steering device 100 according to the embodiment. FIG. 3 is a side view of the steering device 100, corresponding to FIG. 2. In FIG. 2, the steering device 100 is illustrated in a case in which the movable body 130 is in a normal position, and an approximate shape of the steering member 110 is illustrated with a long dashed double-short dashed line. In FIG. 3 to FIG. 5, illustration of the steering member 110 is omitted. The "normal position" of the movable body 130 is a position of the movable body 130 for the steering member 110 to be operated by the driver. FIG. 4 is a second perspective view illustrating an external view of the steering device 100 according to the embodiment. FIG. 5 is a third perspective view illustrating an external view of the steering device 100 according to the embodiment. In FIG. 4 and FIG. 5, the steering device 100 is illustrated in a case in which the movable body 130 is in a stored position. The "stored position" of the movable body 130 is a predetermined position further forward from the normal position, and is the position of the movable body 130 in a case in which the steering member 110 is moved forward to broaden space in front of the driver.

As illustrated in FIG. 2 to FIG. 5, the steering device 100 according to the present embodiment includes the movable body 130, a column unit 120 that is attached to the movable body 130, and a first rail mechanism 200 and a second rail mechanism 300 that guide movement of the movable body 130 in a front-rear direction. The column unit 120 has the reaction force generation device 125 and the shaft member 121 that is rotatably supported by the reaction force generation device 125. The movable body 130 has a main body portion 131 to which the reaction force generation device 125 is fixed, and a nut portion 134 that receives a driving force (propulsive force) in the front-rear direction. That is to say, the movable body 130 supports the shaft member 121 via the reaction force generation device 125 that is fixed to the movable body 130. The column unit 120 moves in conjunction with movement of the movable body 130. That is to say, the steering member 110 attached to the shaft member 121 also moves in conjunction with movement of the movable body 130.

The reaction force generation device 125 is a device that reproduces, as a reaction force, force generated in the steering member, and so forth, while driving in a conventional vehicle in which tires and the steering member are mechanically connected. As illustrated in FIG. 5, the reaction force generation device 125 has a shaft support portion 126 that supports the shaft member 121, and a reaction force motor 127 that generates a rotational driving force that is applied to the shaft member 121. In the present embodiment, the shaft support portion 126 and the reaction force motor 127 are disposed at positions offset in the width direction of the vehicle (Y axial direction in the present embodiment), as illustrated in FIG. 2 and FIG. 5. Thus, the size of the reaction force generation device 125 in the front-rear direction of the vehicle can be made to be relatively small. The rotational driving force of the reaction force motor 127 is applied to the shaft member 121 supported by the shaft support portion 126, by a belt, for example. The reaction force generation device 125 has reduction gears for reducing the rotational speed of the reaction force motor 127 and performing transmission thereof to the shaft member 121, a sensor that detects a rotational angle of the shaft member 121, and so forth, detailed description of which will be omitted.

The reaction force generation device 125 applies reaction force to the steering member 110 via the shaft member 121, by the above configuration. Further, the reaction force generation device 125 can also control the rotational position of the steering member 110 about a steering axis S. The steering axis S is a virtual axis that passes through the center of rotation of the shaft member 121 and extends in the front-rear direction of the vehicle (see FIG. 2, parallel to an X axis in the present embodiment).

The "front-rear direction of the vehicle" generally refers to a direction parallel to a straight-ahead direction of the vehicle, a direction in which a backrest of a driver's seat and the steering device 100 are aligned, a direction connecting front and rear of the vehicle, or the like. For example, a position of the steering member 110 with respect to the upper body of the driver is "forward". The steering axis S, which is the center of rotation of the shaft member 121 and the steering member 110, does not need to strictly agree with the "front-rear direction of the vehicle". For example, in a state in which the vehicle is stopped on a horizontal road surface, the steering axis S may be tilted with respect to a horizontal direction such that the steering member 110 faces slightly upward. Further, the same applies to a case of stating that, for example, "the steering member 110 moves in the front-rear direction of the vehicle", and the path of movement thereof does not need to strictly agree with the "front-rear direction of the vehicle". For example, even in a case in which the steering member 110 moves between a predetermined position in front of the driver and a position further forward and diagonally downward from the driver, the case is expressed as "the steering member 110 moves in the front-rear direction of the vehicle". This applies regardless of whether the path of movement of the steering member 110 is a straight line or a curve. Also, the "front-rear direction of the vehicle" is hereinafter also simply expressed as the "front-rear direction."

The steering member 110 is a member that is manually operated by the driver, and is detachably attached to an end portion in an axial direction (end on the driver side) of the shaft member 121. The steering member 110 rotates about the steering axis S, and accordingly, the shaft member 121 that is linked to the steering member 110 also rotates about the steering axis S. In the manual driving mode, one or more steered wheels 710 of the vehicle are steered as described above, based on this amount of rotation and so forth. A turn indicator lever (omitted from illustration) or the like is disposed between the steering member 110 and the reaction force generation device 125, and in a case of operating the steering member 110, the driver can also operate the turn indicator lever or the like. The shape and size of steering member 110 are not limited to the shape and size illustrated in FIG. 2. The shape and size of the steering member 110 can be decided as appropriate depending on, for example, the size and shape of the steering device 100.

In the present embodiment, the column unit 120 to which the steering member 110 is attached is fixed to the movable body 130, and the movable body 130 is supported by the first rail mechanism 200 and the second rail mechanism 300 so as to be movable in the front-rear direction. The first rail mechanism 200 and the second rail mechanism 300 are fixed to a bracket 500, and the bracket 500 is fixed to the vehicle that is omitted from illustration. That is to say, the first rail mechanism 200 and the second rail mechanism 300 are fixed to the vehicle via the bracket 500. The movable body 130 moves in the front-rear direction relative to the vehicle while being guided by the first rail mechanism 200 and the second rail mechanism 300. As a result, the movable body 130 can be moved between the normal position (see FIG. 2 and FIG. 3), which is a position for the driver to operate the steering member 110, and the stored position (see FIG. 4 and FIG. 5), which is forward of the normal position. The stored position of the movable body 130 is set to be in any one of interior space of a dashboard that is situated in front of the driver. In this embodiment, the movable body 130 can move forward until a rear end portion of the shaft member 121 of the column unit 120 reaches a predetermined position below the bracket 500, as illustrated in FIG. 5. Thus, the steering member 110 attached to the rear end portion of the shaft member 121 can be accommodated in an interior of the dashboard. Note that in this case, space between the first rail mechanism 200 and the second rail mechanism 300 in the width direction of the vehicle can be used as an accommodation region for the steering member 110. This will be described later with reference to FIG. 6.

The steering device 100 according to the present embodiment includes a drive device 140 for driving movement of the movable body 130 in the front-rear direction. As illustrated in FIG. 2 to FIG. 5, the drive device 140 has a movement actuator 141, a feed screw 145, and a transmission mechanism unit 142. The movement actuator 141 and the transmission mechanism unit 142 are fixed to an attaching member 510 that is fixed to a front end portion of the bracket 500. A front end portion of the feed screw 145 is rotatably supported by the attaching member 510, and a rear end portion thereof is rotatably supported by a shaft support member 520 fixed to a rear end portion of the bracket 500. Thus, according to the present embodiment, the drive device 140 is fixed to bracket 500.

Rotational force generated by the movement actuator 141 is transmitted to the feed screw 145 via the transmission mechanism unit 142, thereby causing the feed screw 145 to rotate. The feed screw 145 is screwed into the nut portion 134 fixed to the movable body 130, thereby causing the movable body 130 to move in the front-rear direction. During this movement, the movable body 130 moves while being guided by the first rail mechanism 200 and the second rail mechanism 300 (hereinafter also referred to as two rail mechanisms (200, 300)).

Thus, in the present embodiment, the movable body 130 to which the column unit 120 is fixed is supported by the two rail mechanisms (200, 300), and also is guided in movement in the front-rear direction. The two rail mechanisms (200, 300) are disposed at different positions from each other in the width direction of the vehicle, whereby the movable body 130 can move in the front-rear direction while being stably supported. The configuration and actions of the steering device 100 will be described in detail below with reference to FIG. 6 to FIG. 10, focusing on the configuration and actions of two rail mechanisms (200, 300).

3. Details of Configuration and Actions of Steering Device

Figure 6:
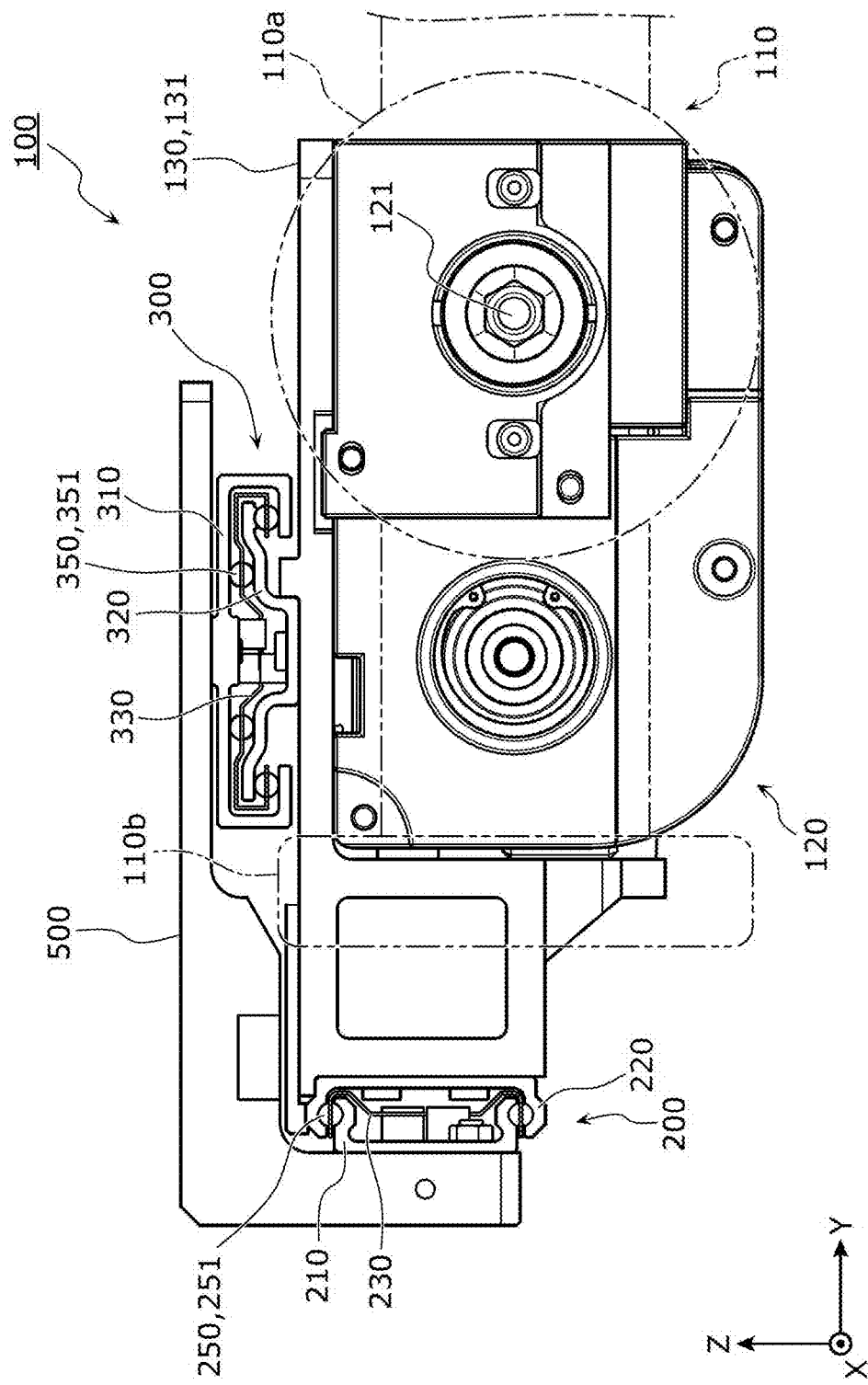
FIG. 6 is a rear view of the steering device according to the embodiment.
Figure 7:
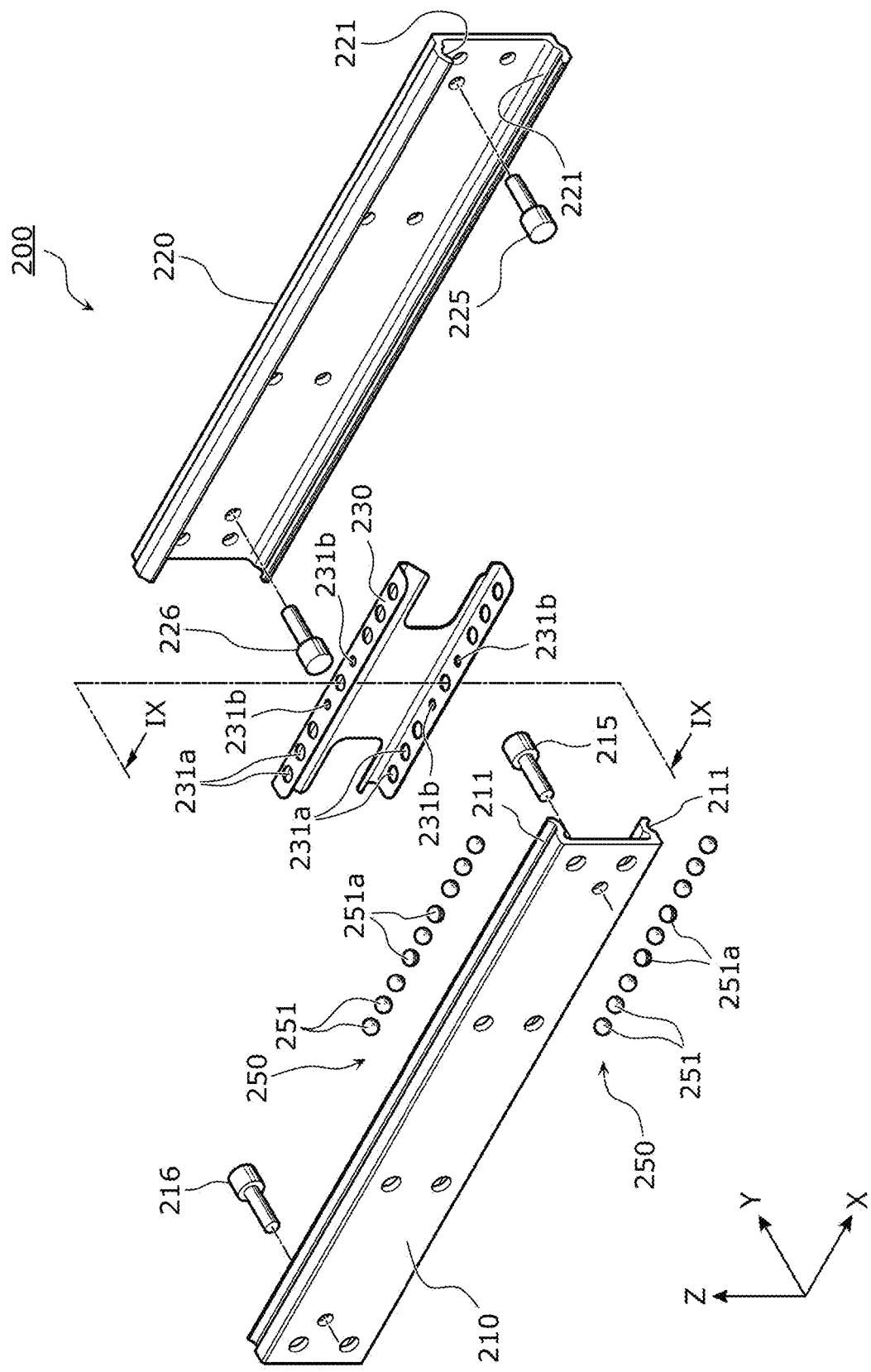
FIG. 7 is a disassembled perspective view of a first rail mechanism according to the embodiment.
Figure 8:
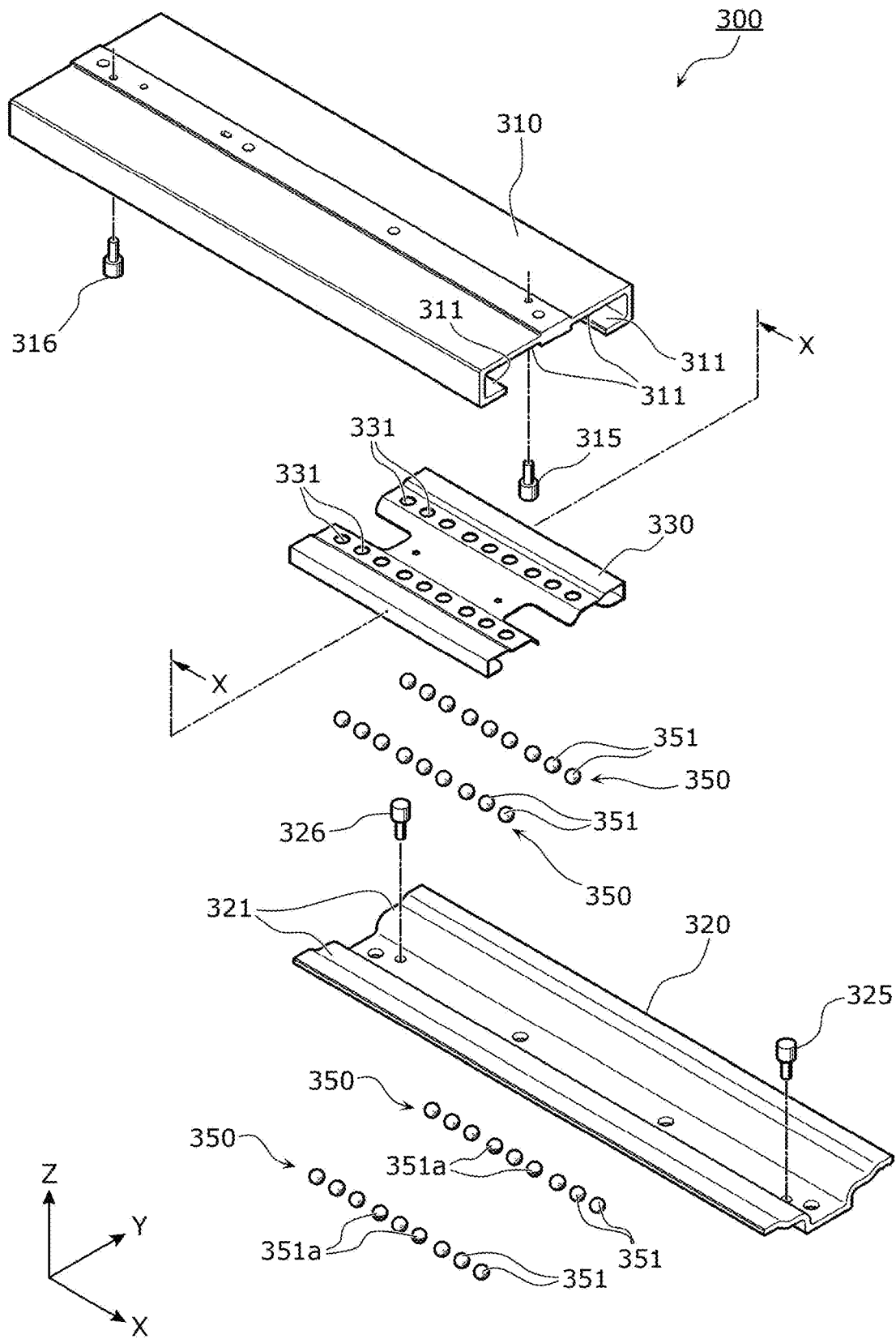
FIG. 8 is a disassembled perspective view of a second rail mechanism according to the embodiment.
Figure 9:
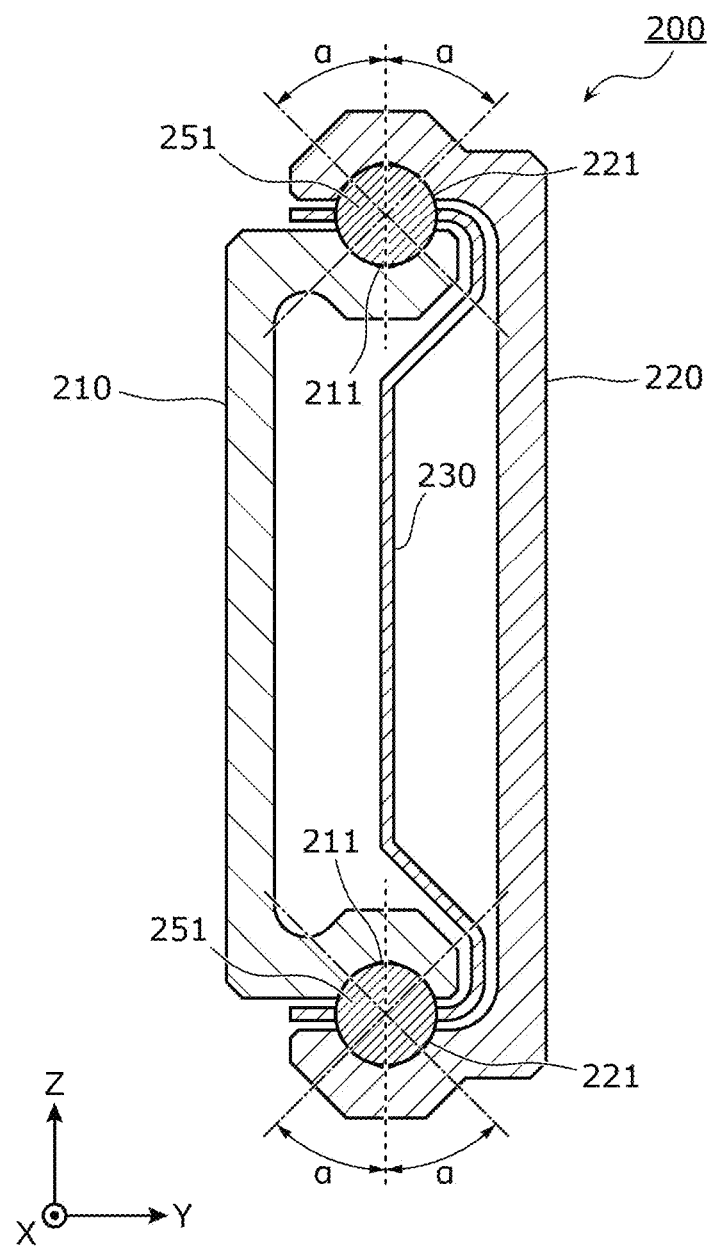
FIG. 9 is a cross-sectional view of the first rail mechanism according to the embodiment.
Figure 10:
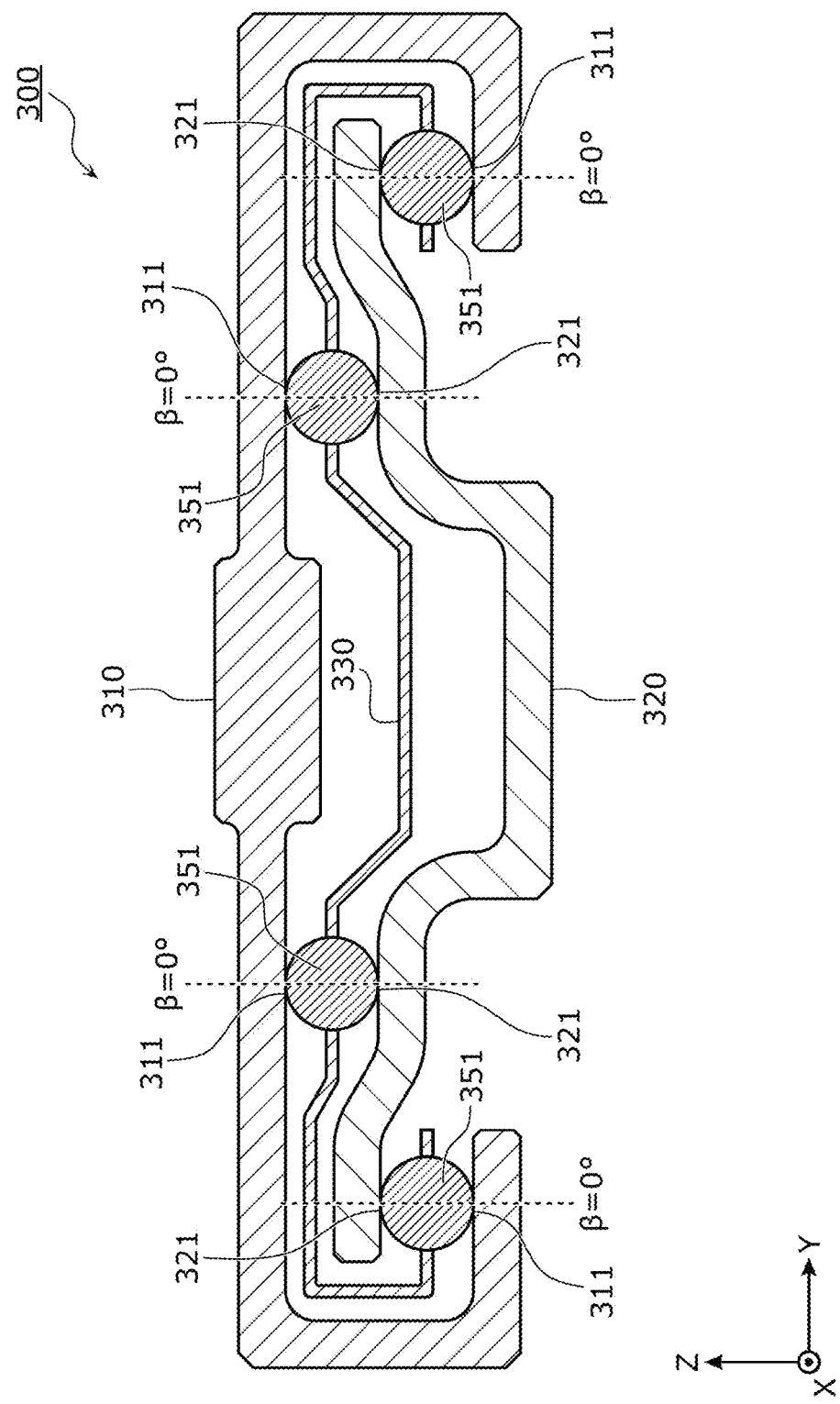
FIG. 10 is a cross-sectional view of the second rail mechanism according to the embodiment.

FIG. 6 is a diagram (rear view) of the steering device 100 according to the embodiment in a case of viewing from the driver's side. In FIG. 6, in order to clearly illustrate the configuration of the two rail mechanisms (200, 300), the drive device 140, the shaft support member 520, and so forth are omitted from illustration, and the approximate shape of the steering member 110 is illustrated by long dashed double-short dashed lines. FIG. 7 is a disassembled perspective view of the first rail mechanism 200 according to the embodiment. FIG. 8 is a disassembled perspective view of the second rail mechanism 300 according to the embodiment. FIG. 9 is a cross-sectional view of the first rail mechanism 200 according to the embodiment. In FIG. 9, a cross-section taken along line IX-IX in FIG. 7 is illustrated. FIG. 10 is a cross-sectional view of the second rail mechanism 300 according to the embodiment. In FIG. 10, a cross-section taken along line X-X in FIG. 8 is illustrated.

In the present embodiment, the movable body 130 includes the two rail mechanisms (200, 300) that are each linear guides disposed at positions spaced apart from each other in the width direction (Y axial direction) of the vehicle, as illustrated in FIG. 6. Each of the two rail mechanisms (200, 300) is configured by combining rails that are elongated in the front-rear direction.

Specifically, as illustrated in FIG. 7 and FIG. 9, the first rail mechanism 200 has a first fixed rail 210, a first moving rail 220 that is slidably attached to the first fixed rail 210, and a plurality of first rolling element rows 250. The first rolling element row 250 includes a plurality of first rolling elements 251 that are arrayed in a moving direction (X axial direction) of the first moving rail 220 with respect to the first fixed rail 210. The first rolling elements 251 are disposed between a first raceway face 211 of the first fixed rail 210 and a second raceway face 221 of the first moving rail 220. In the present embodiment, the first fixed rail 210 has two first raceway faces 211, and the first moving rail 220 has two second raceway faces 221, as illustrated in FIG. 7 and FIG. 9. The first fixed rail 210 and the first moving rail 220 are combined so that the two second raceway faces 221 each face the first raceway faces 211 in a Z axial direction. That is to say, in the first rail mechanism 200, there are two sets of the first raceway face 211 and the second raceway face 221 that face each other in the Z axial direction. In each of the two sets of the first raceway faces 211 and the second raceway faces 221, the first rolling element row 250 is disposed between the first raceway face 211 and the second raceway face 221. In the present embodiment, the first raceway faces 211 are curved faces (inner faces of grooves) that are elongated in the X axial direction and are also concave in a direction away from the second raceway faces 221. The second raceway faces 221 are curved faces (inner faces of grooves) that are elongated in the X axial direction and are also concave in a direction away from the first raceway faces 211. Each of the plurality of first rolling elements 251 included in the first rolling element row 250 is a sphere (bearing ball) made of metal in the present embodiment.

In the present embodiment, each of the two first rolling element rows 250 disposed between the first fixed rail 210 and the first moving rail 220 includes two spacers 251*a* (see FIG. 7). The spacer 251*a* is a sphere having a diameter that is the same as or slightly smaller than the diameter of the plurality of first rolling elements 251 included in the first rolling element row 250. Each of the plurality of first rolling elements 251 included in the first rolling element row 250 is rotatably held by a retainer 230 that is plate-like and that is disposed between the first fixed rail 210 and the first moving rail 220. The plurality of first rolling elements 251 are each held by the retainer 230, and thus roll while maintaining their relative positions as to each other. The retainer 230 has a plurality of first rolling element pockets (opening portions) 231*a* for holding the first rolling elements 251 and a plurality of spacer pockets (opening portions) 231*b* for holding the spacers 251*a*, respectively. The diameter of the spacer pockets 231*b* is smaller than the diameter of the first rolling element pockets 231*a*. Each of the plurality of spacers 251*a* included in the first rolling element row 250 has two hemispheres, and these two hemispheres are joined in a state of clamping a peripheral edge of the spacer pocket 231*b* of the retainer 230 therebetween in the up-down (Z axis) direction, and thus are fixed to the retainer 230. The retainer 230 is fixed at a position passing through the center position of the spacers 251*a*, and thereby the Z axial direction position of the retainer 230 with respect to the first raceway face 211 and the second raceway face 221 is positioned at the center in the Z axial direction. As a result, the plurality of first rolling elements 251 included in the first rolling element row 250 can roll as appropriate. Providing at least two spacers 251*a* for each of the two first rolling element rows 250 is sufficient. The two hemispheres of the spacer 251*a* have a convex portion formed on one facing face and a concave portion formed on the other facing face, and are joined by concave-convex press fitting, but this is not restrictive. The order in which the first rolling element pockets 231*a* and the spacer pockets 231*b* of the retainer 230 are disposed can be set as appropriate.

In the first rail mechanism 200 configured in this way, the first fixed rail 210 is fixed to the bracket 500, as illustrated in FIG. 2 to FIG. 6. That is to say, the first fixed rail 210 is fixed to the vehicle via the bracket 500. The first moving rail 220 is fixed to the main body portion 131 of the movable body 130, as illustrated in FIG. 6. The movable body 130, and the column unit 120 fixed to the movable body 130, move in the front-rear direction in conjunction with the front-rear direction of the first moving rail 220.

The first moving rail 220 has the plurality of (two in the present embodiment) first rolling element rows 250 disposed between itself and the first fixed rail 210, and thereby moves smoothly in the front-rear direction with respect to the first fixed rail 210. During this movement, the two first rolling element rows 250 move in the front-rear direction with respect to the first fixed rail 210 and the first moving rail 220 while maintaining a state of being held by the retainer 230. A stopper that comes into contact with the retainer 230 is disposed on each of the first fixed rail 210 and the first moving rail 220. This suppresses the two first rolling element rows 250 and the retainer 230 from falling out from the first fixed rail 210 and the first moving rail 220. Specifically, as illustrated in FIG. 7, first fixed stoppers 215 and 216 are disposed on the first fixed rail 210 at positions spaced apart from each other in the X axial direction. First moving stoppers 225 and 226 are disposed on the first moving rail 220 at positions spaced apart from each other in the X axial direction. Thus, the retainer 230 is movable with respect to the first fixed rail 210 only between the first fixed stopper 215 and the first fixed stopper 216. Further, the retainer 230 is movable with respect to the first moving rail 220 only between the first moving stopper 225 and the first moving stopper 226. In this case, the retainer 230 does not fall out from the first fixed rail 210 and the first moving rail 220 even when moving in the front-rear direction in conjunction with the first moving rail 220 moving in the front-rear direction. As a result, the two first rolling element rows 250 held by the retainer 230 also do not fall out from the first fixed rail 210 and the first moving rail 220.

Further, in a state in which the retainer 230 is interposed between the first fixed stopper 215 on a rear end side of the first fixed rail 210 and the first moving stopper 226 on a front end side of the first moving rail 220, the first moving rail 220 cannot move rearward from that position. That is to say, the first fixed stopper 215 and the first moving stopper 226 also function as regulating members that regulate rearward movement of the first moving rail 220 (rearward detachment from the first fixed rail 210). Further, in a state in which the retainer 230 is interposed between the first fixed stopper 216 on a front end side of the first fixed rail 210 and the first moving stopper 225 on a rear end side of the first moving rail 220, the first moving rail 220 cannot move forward from that position. That is to say, the first fixed stopper 216 and the first moving stopper 225 also function as regulating members that regulate forward movement of the first moving rail 220 (forward detachment from the first fixed rail 210).

As illustrated in FIG. 8 and FIG. 10, the second rail mechanism 300 according to the present embodiment has a second fixed rail 310, a second moving rail 320 that is slidably attached to the second fixed rail 310, and a plurality of second rolling element rows 350. The second rolling element row 350 includes a plurality of second rolling elements 351 that are arrayed in a moving direction (X axial direction) of the second moving rail 320 with respect to the second fixed rail 310. The second rolling element row 350 is disposed between a third raceway face 311 of the second fixed rail 310 and a fourth raceway face 321 of the second moving rail 320. In the present embodiment, as illustrated in FIG. 8 and FIG. 10, the second fixed rail 310 has four third raceway faces 311, and the second moving rail 320 has four fourth raceway faces 321. Each of these eight raceway faces is formed of a portion of a planar part of the second fixed rail 310 or the second moving rail 320. The second fixed rail 310 and the second moving rail 320 are combined so that the four fourth raceway faces 321 each face the third raceway faces 311 in the Z axial direction. That is to say, in the second rail mechanism 300, there are four sets of the third raceway face 311 and the fourth raceway face 321 that face each other in the Z axial direction. In each of the four sets of the third raceway faces 311 and the fourth raceway faces 321, the second rolling element row 350 is disposed between the third raceway face 311 and the fourth raceway face 321. Thus, the second rail mechanism 300 has four second rolling element rows 350. As illustrated in FIG. 10, two of the four second rolling element rows 350 are disposed below the second moving rail 320 (in a negative Z axis direction), and the remaining two second rolling element rows 350 are disposed above the second moving rail 320 (in a positive Z axis direction). In the present embodiment, each of the third raceway faces 311 and the fourth raceway faces 321 is a plane that is elongated in the X axial direction. Each of the plurality of second rolling elements 351 is a sphere (bearing ball) made of metal in the present embodiment, in the same way as the first rolling elements 251.

In the present embodiment, each of the two second rolling element rows 350 disposed below the second moving rail 320 (in the negative Z axis direction) includes two spacers 351a (see FIG. 8). The spacer 351a is a sphere having a diameter that is the same as or slightly smaller than the diameter of the plurality of second rolling elements 351 included in the second rolling element row 350. Each of the plurality of second rolling elements 351 included in the second rolling element row 350 is rotatably held by a retainer 330 that is plate-like and that is disposed between the second fixed rail 310 and the second moving rail 320. The plurality of second rolling elements 351 are each held by the retainer 330, and thus roll while maintaining their relative positions. The retainer 330 has a plurality of second rolling element pockets (opening portions) 331 for holding the second rolling elements 351 and a plurality of spacer pockets (opening portions) for holding the spacers 351a, respectively. Although not illustrated in FIG. 8, the plurality of spacer pockets are provided on the Z axis minus direction side of the retainer 330. The diameter of the spacer pockets is smaller than the diameter of the second rolling element pockets 331. The plurality of spacers 351a included in the second rolling element row 350 have two hemispheres, and these two hemispheres are joined in a state of clamping a peripheral edge of the spacer pocket of the retainer 330 therebetween in the up-down (Z axis) direction, and thus are fixed to the retainer 330. The retainer 330 is fixed at a position passing through the center position of the spacers 351a, and thereby the Z axial direction position of the retainer 330 with respect to the third raceway face 311 and the fourth raceway face 321 is positioned at the center in the Z axial direction. As a result, the plurality of second rolling elements 351 included in the second rolling element row 350 can roll as appropriate. Providing at least two spacers 351a for each of two of the second rolling element rows 350 out of the four second rolling element rows 350 illustrated in FIG. 8 is sufficient. Each of the four second rolling element rows 350 may include at least two spacers 351a. The two hemispheres of the spacer 351a have a convex portion formed on one facing face and a concave portion formed on the other facing face, and are joined by concave-convex press fitting, but this is not restrictive. The order in which the second rolling element pockets 331 and the spacer pockets of the retainer 330 are disposed can be set as appropriate.

In the second rail mechanism 300 configured in this way, the second fixed rail 310 is fixed to an attachment face of the bracket 500 that is parallel to the width direction (Y axial direction) of the vehicle, as illustrated in FIG. 2 to FIG. 6. That is to say, the second fixed rail 310 is fixed to the vehicle via the bracket 500. The second moving rail 320 is fixed to the movable body 130, as illustrated in FIG. 6. That is to say, the movable body 130 is fixed to the first moving rail 220 and the second moving rail 320. The movable body 130, and the column unit 120 fixed to the movable body 130, move in the front-rear direction in conjunction with movement of the first moving rail 220 and the second moving rail 320 in the front-rear direction.

The second moving rail 320 has the plurality of (four in the present embodiment) second rolling element rows 350 disposed between itself and the second fixed rail 310, and thereby moves smoothly in the front-rear direction with respect to the second fixed rail 310. The retainer 330 that holds the four second rolling element rows 350 is movable in the front-rear direction similar to the retainer 230 that the first rail mechanism 200 has. Accordingly, a stopper that comes into contact with the retainer 330 is disposed on each of the second fixed rail 310 and the second moving rail 320, so that the four second rolling element rows 350 and the retainer 330 are suppressed from falling out from the second fixed rail 310 and the second moving rail 320. Specifically, as illustrated in FIG. 8, second fixed stoppers 315 and 316 are disposed on the second fixed rail 310 at positions spaced apart from each other in the X axial direction. Second moving stoppers 325 and 326 are disposed on the second moving rail 320 at positions spaced apart from each other in the X axial direction. Thus, the retainer 330 is movable with respect to the second fixed rail 310 only between the second fixed stopper 315 and the second fixed stopper 316. Further, the retainer 330 is movable with respect to the second moving rail 320 only between the second moving stopper 325 and the second moving stopper 326. As a result, the retainer 330 does not fall out from the second fixed rail 310 and the second moving rail 320, and therefore the four second rolling element rows 350 do not fall out from the second fixed rail 310 and the second moving rail 320, either.

Further, the second fixed stopper 315 and the second moving stopper 326 are in a state of being on both sides of the retainer 330 in the front-rear direction, and accordingly function as regulating members that regulate the second moving rail 320 from moving rearward (rearward detachment from the second fixed rail 310). The second fixed stopper 316 and the second moving stopper 325 are in a state of being on both sides of the retainer 330 in the front-rear direction, and accordingly function as regulating members that regulate the second moving rail 320 from moving forward (forward detachment from the second fixed rail 310).

The movement of the first moving rail 220 in the front-rear direction with respect to the first fixed rail 210 is driven by the drive device 140 as described above. Detection results of stopping of the first moving rail 220 or the second moving rail 320 by the stopper may be used in controlling this drive device 140. Specifically, in a case in which the first moving rail 220 is stopped by a stopper such as the first fixed stopper 215 or the like, a control device (omitted from illustration) that controls the drive device 140 detects increase in load torque of the movement actuator 141 due to the first moving rail 220 stopping. In a case of detecting the increase in the load torque, the control device stops the actions of the movement actuator 141. It is not essential to use stoppers to stop the first moving rail 220 and the second moving rail 320. For example, the control device may control the drive device 140 to stop the movement of the first moving rail 220 and the second moving rail 320 based on detection results of a sensor that detects the position of the movable body 130 and so forth.

As described above, the steering device 100 according to the present embodiment includes the shaft member 121, which is a steering input shaft to which the steering member 110 is attached, the movable body 130, the first rail mechanism 200, and the second rail mechanism 300. The movable body 130 rotatably supports the shaft member 121. The first rail mechanism 200 and the second rail mechanism 300 guide the movement of the movable body 130 in the front-rear direction of the vehicle. The first rail mechanism 200 includes the first fixed rail 210 that is fixed to the vehicle, the first moving rail 220 that is slidably attached to the first fixed rail 210, and the first rolling element rows 250. The first fixed rail 210 has the first raceway faces 211. The first moving rail 220 has the second raceway faces 221, and also is attached to the movable body 130. The first rolling element rows 250 are disposed between the first raceway faces 211 and the second raceway faces 221. The first rolling element rows 250 include the plurality of first rolling elements 251 that are capable of rolling. The second rail mechanism 300 includes the second fixed rail 310 that is fixed to the vehicle, the second moving rail 320 that is slidably attached to the second fixed rail 310, and the second rolling element rows 350. The second fixed rail 310 has the third raceway faces 311. The second moving rail 320 has the fourth raceway faces 321, and also is attached to the movable body 130. The second rolling element rows 350 are disposed between the third raceway faces 311 and the fourth raceway faces 321. The second rolling element rows 350 each include the plurality of second rolling elements 351 that are capable of rolling. A contact angle $\alpha$ of each of the plurality of first rolling elements 251 with respect to the first raceway faces 211 and the second raceway faces 221, and a contact angle $\beta$ of each of the plurality of second rolling elements 351 with respect to the third raceway faces 311 and the fourth raceway faces 321 are different from each other (see FIG. 9 and FIG. 10).

According to this configuration, the steering member 110 operated by the driver is supported by the movable body 130 via the shaft member 121. This movable body 130 is supported so as to be movable in the front-rear direction by the two rail mechanisms (200, 300) disposed at different positions from each other. Accordingly, the movable body 130 is stably supported. As a result, stability of support of the steering member 110 attached to the shaft member 121 is improved.

Further, the contact angles ($\alpha$, $\beta$) of the rolling elements in the two rail mechanisms (200, 300) are different from each other. Accordingly, primary load components supported by each of the first rail mechanism 200 and the second rail mechanism 300 are different from each other. Thus, stability in supporting the movable body 130 is more reliably ensured.

In this way, the steering device 100 according to the present embodiment is a steering device that can broaden the space in front of the driver and also can stably support the steering member 110.

Now, in a case in which the contact angles of the rolling elements in the two rail mechanisms (200, 300) are the same, directions in which movement (displacement) does not readily occur, in directions orthogonal to the original moving direction (X axial direction) of the first moving rail 220 and the second moving rail 320, agree. As a result, in a case in which the moving directions of the first moving rail 220 and the second moving rail 320, which are both connected to the movable body 130, are not strictly parallel, the movement of one may be restrained by the other. With respect to this point, in the present embodiment, the contact angles of the rolling elements in the two rail mechanisms (200, 300) are different from each other. Therefore, expanding and collapsing actions of one of the two rail mechanisms (200, 300) are unlikely to interfere with the expanding and collapsing actions of the other. Effects of the contact angles $\alpha$ and $\beta$ being different from each other will be described in detail later with reference to FIG. 9 and FIG. 10.

More specifically, in the present embodiment, in the first rail mechanism 200 are disposed a plurality of sets of a combination of the first raceway face 211, the second raceway face 221, and the first rolling element row 250 disposed therebetween. Accordingly, rigidity of the first rail mechanism 200 as a whole is further improved, and also the smoothness of the expanding and collapsing actions is also ensured. The second rail mechanism 300 is also similar, and has the plurality of combinations of the third raceway faces 311, the fourth raceway faces 321, and the second rolling element rows 350 disposed therebetween, as configurations for the second moving rail 320 to slide with respect to the second fixed rail 310. Accordingly, rigidity of the second rail mechanism 300 is further improved, and also the smoothness of the expanding and collapsing actions is also ensured. Thus, according to the steering device 100 including such two rail mechanisms (200, 300), the steering member 110 can be supported more stably.

In the present embodiment, the first rail mechanism 200 is disposed at a different position from the movable body 130 in the width direction of the vehicle, and the second rail mechanism 300 is disposed at a position upward from the movable body 130 in the up-down direction of the vehicle (see FIG. 6).

According to this configuration, the first rail mechanism 200 is at a position spaced apart from the movable body 130 that supports the shaft member 121 in the width direction of the vehicle, and the second rail mechanism 300 is at a position upward from the movable body 130 in the up-down direction of the vehicle. Accordingly, out of a moment load applied to the movable body 130, a load component primarily in the width direction is supported by the first rail mechanism 200, and a load component primarily in the up-down direction is supported by the second rail mechanism 300. Thus, as viewed from the movable body 130, movement in the right-left direction (width direction of the vehicle) is primarily regulated by the first rail mechanism 200, and movement in the up-down direction is primarily regulated by the second rail mechanism 300. Thus, even in a case in which a relatively large force is applied to the movable body 130 by applying external force to the shaft member 121 in any of the up, down, right, and left directions, the movable body 130 is stably supported by the two rail mechanisms (200, 300). That is to say, the steering device 100 has relatively high rigidity for supporting the movable body 130, and as a result, the stability of supporting the steering member 110 attached to the shaft member 121 is more reliably improved. The second rail mechanism 300 is disposed at a position upward from the shaft member 121 in the up-down direction of the vehicle. Accordingly, the space in front of the driver and space around his/her feet can be broadened. Accordingly, a problem of interference between the rail mechanism and the driver's legs, or other members such as a brake pedal or the like, which would occur in a case in which the rail mechanism is disposed at a lower portion of the steering device 100, for example, does not occur.

Further, in the present embodiment, as illustrated in FIG. 9, a total number of points of contact of each of the plurality of first rolling elements 251 with respect to the first raceway faces 211 and the second raceway faces 221 is three or more. As illustrated in FIG. 10, a total number of points of contact of each of the plurality of second rolling elements 351 with respect to the third raceway faces 311 and the fourth raceway faces 321 is two. According to this configuration, in the first rail mechanism 200, the first rolling elements 251 that roll between the first fixed rail 210 and the first moving rail 220 come into contact with the raceway faces (first raceway faces 211 and second raceway faces 221) in three or more directions as viewed from the centers of the first rolling elements 251. Accordingly, movement (displacement) does not readily occur for the first moving rail 220 in the three or more directions, in directions that are orthogonal to the moving direction (X axial direction). That is to say, the first rail mechanism 200 has relatively high load bearing capacity in the three or more directions.

The total number of points of contact for each of the first rolling elements 251 is three or more, and also the total number of points of contact for each of the second rolling elements 351 is two, whereby difference between the contact angle α in the first rail mechanism 200 and the contact angle β in the second rail mechanism 300 is great. Thus, the extending and collapsing actions of one of the two rail mechanisms (200, 300) can be suppressed from interfering with the extending and collapsing actions of the other more effectively.

Characteristics of the contact angles of the rolling elements in each of the first rail mechanism 200 and the second rail mechanism 300 described above will be described in further detail with reference to FIG. 9 and FIG. 10. In a case of focusing on one first rolling element 251 in the first rail mechanism 200 according to the present embodiment, the first rolling element 251 is disposed between the first raceway face 211 and the second raceway face 221, as illustrated in FIG. 9. Each of the first raceway face 211 and the second raceway face 221 is an inner face of a groove having the same shape that can accommodate a portion of the first rolling element 251. Specifically, this groove is a groove that has a shape called, for example, a Gothic arc groove. In the present embodiment, in a cross-section orthogonal to the direction in which the raceway faces (grooves) extend (X axial direction), each of the first raceway face 211 and the second raceway face 221 has two points of contact with the first rolling element 251 that is a sphere. In this case, the contact angle of the first rolling element 251 with respect to the first raceway face 211 and the second raceway face 221 is α in FIG. 9. In the present embodiment, the first rolling element 251 is interposed between the first fixed rail 210 and the first moving rail 220 in the Z axial direction, and also the first moving rail 220 moves in the X axial direction. In this case, the contact angle α is an angle formed between a plane (reference plane) that is parallel to an XZ plane passing through the center of the first rolling element 251 and straight lines connecting the center and the points of contact, and in the present embodiment, the contact angle α is, for example, 45°. Accordingly, even in a case in which an external force is applied to the first moving rail 220 connected to the movable body 130 in either the width direction of the vehicle (Y axial direction) or the up-down direction of the vehicle (Z axial direction), the first rail mechanism 200 can suppress movement of the first moving rail 220 by resisting this external force.

Conversely, with the second rail mechanism 300 according to the embodiment, as illustrated in FIG. 10, the contact angle β of the second rolling elements 351 with respect to the third raceway faces 311 and the fourth raceway faces 321 is 0°. In a case of focusing on one second rolling element 351 in the second rail mechanism 300 according to the present embodiment, the second rolling element 351 is disposed between the third raceway face 311 and the fourth raceway face 321, as illustrated in FIG. 10. The third raceway face 311 is a plane that is formed of a portion of an inner face of the second fixed rail 310 and that extends in the X axial direction. The fourth raceway face 321 is a plane that is formed of a portion of a surface of the second moving rail 320 and that extends in the X axial direction. In this case, in a cross-section orthogonal to the direction in which the raceway faces extend (X axial direction), each of the third raceway face 311 and the fourth raceway face 321 is in contact with the second rolling element 351, which is a sphere, at one point. In the present embodiment, the second rolling element 351 is interposed between the second fixed rail 310 and the second moving rail 320 in the Z axial direction, and also the second moving rail 320 moves in the X axial direction. In this case, the contact angle β of the second rolling element 351 with the third raceway face 311 and the fourth raceway face 321 is an angle formed between a plane (reference plane) that is parallel to the XZ plane passing through the center of the second rolling element 351 and a straight line connecting the center and the points of contact. That is to say, in the present embodiment, the contact angle β is 0°. Accordingly, in a case in which an external force in the up-down direction (Z axial direction) of the vehicle is applied to the second moving rail 320 connected to the movable body 130, the second rail mechanism 300 can suppress movement of the second moving rail 320 in the up-down direction by resisting this external force. On the other hand, in a case in which an external force in the width direction (Y axial direction) of the vehicle is applied to the second moving rail 320, the second rail mechanism 300 allows movement of the second moving rail 320 in the width direction of the vehicle within a predetermined range. However, in the present embodiment, the movable body 130 is also connected to the first rail mechanism 200, and accordingly the first rail mechanism 200 can resist external force in the width direction of the vehicle, as described above. That is to say, movement of the movable body 130 in the width direction of the vehicle is primarily regulated by the first rail mechanism 200.

A case will be assumed in which a load is applied to the steering member 110 in a direction orthogonal to the axial direction of the shaft member 121 (steering axis S, see FIG. 2), such as when the driver applies a load to the steering member 110 or the like. In this case, there is a possibility that a great rotational moment load will act on the first rail mechanism 200 and the second rail mechanism 300 from the shaft member 121 via the movable body 130. Regarding this point, in the present embodiment, as described above, the contact angle α and the contact angle β are different from each other, and accordingly primary load supporting directions of each of the first rail mechanism 200 and the second rail mechanism 300 are different from each other. That is to say, the first rail mechanism 200 and the second rail mechanism 300 can primarily support loads in directions that are different from each other. Accordingly, an up-down direction component and a width direction component of the rotational moment load can be stably supported by the first rail mechanism 200 and the second rail mechanism 300. As a result, supporting rigidity regarding the movable body 130 is improved.

In a case in which the number of points of contact regarding the first rolling element 251 is three or more, it is preferable that on a raceway face having a plurality of contact points with the first rolling element 251, at least one point of contact and one or more other points of contact are disposed on opposite sides of the reference plane from each other, from the viewpoint of ensuring supporting rigidity. With respect to this point, in the present embodiment, the two points of contact between the first rolling element 251 and the first raceway face 211 are disposed on opposite sides of the reference plane from each other, across the reference plane, as illustrated in FIG. 9. Further, the two points of contact between the first rolling element 251 and the second raceway face 221 are disposed on opposite sides of the reference plane from each other, across the reference plane, as illustrated in FIG. 9. Thus, supporting rigidity regarding the movable body 130 is more reliably ensured.

Note that the contact angles α at each of the three or more points of contact of the first rolling element 251 do not need to be the same. For example, assumption will be made regarding a case in which one of the first raceway face 211 and the second raceway face 221 comes into contact with the first rolling element 251 at one point, and also the other of the first raceway face 211 and the second raceway face 221 comes into contact with the first rolling element 251 at two points. In this case, the three contact angles ($\alpha 1$, $\alpha 2$, $\alpha 3$) corresponding to these three points of contact may be different from one another. In this case, it is sufficient for at least one contact angle of the three contact angles ($\alpha 1$, $\alpha 2$, $\alpha 3$) to be different from the contact angle β of the second rolling element 351.

Also, in the present embodiment, a structure is employed in which the two rail mechanisms (200, 300) that both extend and collapse in the X axial direction are disposed in parallel, and the movable body 130 is attached to these two rail mechanisms (200, 300), so that the movable body 130 advances and retreats. Accordingly, in a case in which the two rail mechanisms (200, 300) are not disposed strictly in parallel, for example, a sliding load (mechanical resistance when sliding) on the two rail mechanisms (200, 300) becomes great. Thus, there is a possibility that the movable body 130 will not be able to move smoothly between the normal position and the stored position. However, in the present embodiment, the second rail mechanism 300 has a structure that allows the second moving rail 320 to move (be displaced) in the width direction of the vehicle, as described above. Accordingly, even in a case in which the two rail mechanisms (200, 300) are not strictly parallel when viewed from the up-down direction, for example, the second moving rail 320 can be displaced in the width direction of the vehicle, whereby an increase in the sliding load of the two rail mechanisms (200, 300) is suppressed. As a result, smooth movement of the movable body 130 between the normal position and the stored position is executed. Further, strictness is not required regarding disposing the first rail mechanism 200 and the second rail mechanism 300 in parallel, for example, and accordingly work of attaching the first rail mechanism 200 and the second rail mechanism 300 to the bracket 500 is more efficient. As a result, manufacturing efficiency of the steering device 100 can be improved, or manufacturing costs can be suppressed.

Also, in the present embodiment, the first rail mechanism 200 has two first rolling element rows 250, and the second rail mechanism 300 has three or more second rolling element rows 350.

Thus, in the present embodiment, in the first rail mechanism 200, the number of first rolling element rows 250 that cause the first moving rail 220 to smoothly slide with respect to the first fixed rail 210 is two. Accordingly, pitch error (deviation in intervals between raceway rows) that tends to occur in a case in which the number of first rolling element rows 250 is three rows or more, for example, is less likely to occur, and accordingly problems in the extending and collapsing actions of the first rail mechanism 200 due to compounded effects of positional deviation of each of the plurality of first rolling element rows 250 are unlikely to occur. Regarding the second rail mechanism 300, the number of second rolling element rows 350 that cause the second moving rail 320 to smoothly slide with respect to the second fixed rail 310 is three or more (four in the present embodiment). This improves the load bearing capacity of the second rail mechanism 300 that supports, in a state of suspending (from above), the movable body 130 to which the column unit 120 is fixed. This is advantageous for stable support of the steering member 110 that is supported by the movable body 130.

Further, in the present embodiment, the first rail mechanism 200 and the second rail mechanism 300 are disposed spaced apart from each other in the width direction of the vehicle, as illustrated in FIG. 5 and FIG. 6, for example.

A case will be assumed in which a load is applied to the steering member 110 in a direction orthogonal to the steering axis S (see FIG. 2), such as when the driver applies a load to the steering member 110, or the like. Even in this case, the first rail mechanism 200 and the second rail mechanism 300 of which primary load supporting directions differ from each other are disposed at positions spaced apart from each other in the width direction of the vehicle. Accordingly, the first rail mechanism 200 and the second rail mechanism 300 can stably support the up-down direction load component and the width direction load component of the load. Thus, the supporting rigidity regarding the movable body 130 is improved.

There is space created between the first rail mechanism 200 and the second rail mechanism 300 in a case of viewing the steering device 100 from the rear thereof (positive X axial direction), due to their being spaced apart. This space accommodates a grasping portion 110b, which is a part of the steering member 110 that is grasped by the driver, for example, as illustrated in FIG. 6. That is to say, the space between the first rail mechanism 200 and the second rail mechanism 300 can be used as an accommodation region for the steering member 110. Thus, the steering member 110 can be moved to a predetermined position below the bracket 500 (see FIG. 5). This is advantageous from a viewpoint of accommodating the steering member 110 as far away from the driver as possible (securing as much space in front of the driver as possible) in a case in which the driver is not using the steering member 110. The member accommodated in the space between the first rail mechanism 200 and the second rail mechanism 300 is not limited to the steering member 110, and a turn indicator lever or the like (omitted from illustration) that is provided on the column unit 120 may be accommodated in this space as well.

In the present embodiment, as illustrated in FIG. 6, the second rail mechanism 300 is disposed at a position that is higher than the shaft member 121 in the up-down direction, but is a position that is not directly above the shaft member 121.

According to this configuration, space located directly above the shaft member 121 and to the side of the second rail mechanism 300 in the width direction of the vehicle can be used as an accommodation region for the steering member 110 and the column unit 120. A case will be assumed in which a hub portion 110a of the steering member 110, which is a part connected to the shaft member 121, is relatively large, as illustrated in FIG. 6, for example. Even in this case, the second rail mechanism 300 is not disposed directly above the shaft member 121, and accordingly, when moving the movable body 130 to the stored position, the hub portion 110a and the second rail mechanism 300 can be kept from interfering with each other. The member accommodated in the space directly above the shaft member 121 is not limited to the steering member 110, and a turn indicator lever or the like (omitted from illustration) that is provided on the column unit 120 may be accommodated in this space.

The steering device 100 according to the embodiment has been described above, dealing mainly with the two rail mechanisms (200, 300) that guide the movement of the movable body 130. However, the configurations of the two rail mechanisms included in the steering device 100 may be different from the configurations of the two rail mechanisms illustrated in FIG. 2 to FIG. 10. Accordingly, modifications of the two rail mechanisms that the steering device 100 can include will be described below, mainly regarding differences as to the above embodiment.

4-1. Modification 1

In the first rail mechanism 200, the number of points of contact of the first rolling elements 251 with the raceway faces (points of contact regarding the first rolling elements 251) may be two, as in the second rail mechanism 300. For example, a rail mechanism having the same structure as the second rail mechanism 300 may be disposed at the position of the first rail mechanism 200, with a thickness direction thereof (the direction in which the fixed rail and the moving rail are arrayed) in an orientation facing the width direction (Y axial direction) of the vehicle. In this case, in the rail mechanism, the moving rail is structurally allowed to move (be displaced) in the up-down direction of the vehicle. However, this rail mechanism can resist external force in the thickness direction thereof (the direction in which the fixed rail and the moving rail are arrayed), i.e., in the width direction of the vehicle, in the same way as with the second rail mechanism 300. Accordingly, movement of the movable body 130 in the width direction of the vehicle is primarily regulated by the rail mechanism. Specifically, details are as follows.

Figure 11:
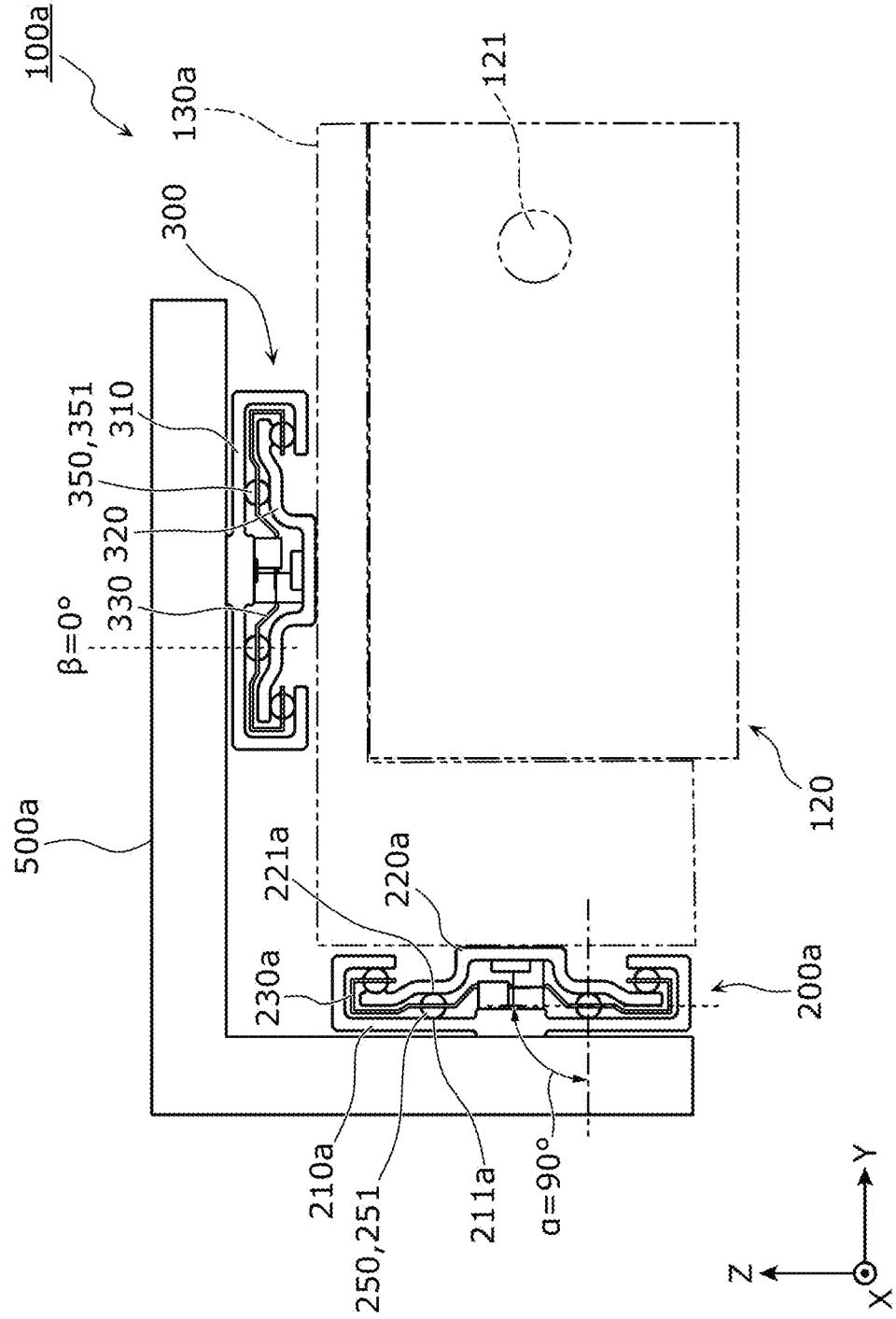
FIG. 11 is a rear view of a steering device according to Modification 1 of the embodiment.

FIG. 11 is a diagram (rear view) of a steering device 100a according to Modification 1 of the embodiment, as viewed from the driver's side. In FIG. 11, the drive device 140, the shaft support member 520, and so forth are omitted from illustration, and the bracket 500a is illustrated in a simplified manner, in order to clearly illustrate the configurations of two rail mechanisms (200a, 300). In FIG. 11, approximate shapes of a movable body 130a, the column unit 120, and the shaft member 121 are illustrated by long dashed double-short dashed lines. These supplementary matters regarding FIG. 11 also apply to FIG. 12 and FIG. 13, which will be described later.

In the present Modification, the movable body 130a is supported by the first rail mechanism 200a and the second rail mechanism 300 that are disposed at different positions from each other, as illustrated in FIG. 11. In the first rail mechanism 200a, first raceway faces 211a and second raceway faces 221a are each in contact with the first rolling elements 251, which are spheres, at one point. That is to say, in the first rail mechanism 200a according to the present Modification, the total number of points of contact for each of the first rolling elements 251 is two.

In the present Modification, more specifically, as illustrated in FIG. 11, the first rail mechanism 200a is the second rail mechanism 300 that has been rotated 90° counterclockwise about an axis parallel to the X axis. In other words, the first rail mechanism 200a according to the present Modification has the same structure as the second rail mechanism 300, and also is disposed with the thickness direction thereof in an orientation facing the width direction (Y axial direction) of the vehicle. That is to say, the first rail mechanism 200a has a first fixed rail 210a, a first moving rail 220a that is slidably attached to the first fixed rail 210a, and the first rolling element rows 250. The first rolling element rows 250 include the plurality of first rolling elements 251. The first rolling element rows 250 are disposed between the first raceway faces 211a of the first fixed rail 210a and the second raceway faces 221a of the first moving rail 220a. Each of the plurality of first rolling elements 251 is rotatably held by a retainer 230a that is plate-like.

As described in the above embodiment, the second rail mechanism 300 according to the present Modification has the second fixed rail 310, the second moving rail 320, and the second rolling element rows 350, and the second rolling element rows 350 include the plurality of second rolling elements 351. The second rolling element rows 350 are disposed between the third raceway faces 311 of the second fixed rail 310 and the fourth raceway faces 321 of the second moving rail 320. Each of the plurality of second rolling elements 351 is rotatably held by the retainer 330 that is plate-like.

In the steering device 100a configured in this way, the contact angle α of each of the plurality of first rolling elements 251 with respect to the first raceway faces 211a and the second raceway faces 221a, and the contact angle β of each of the plurality of second rolling elements 351 with respect to the third raceway faces 311 and the fourth raceway faces 321, are different from each other. This is common to the steering device 100 according to the embodiment. Specifically, as illustrated in FIG. 11, the contact angle α for the first rolling elements 251 is 90°, and the contact angle β for the second rolling elements 351 is 0°.

According to this configuration, the contact angle α and the contact angle β are different from each other, and accordingly the respective primary load supporting directions of the first rail mechanism 200a and the second rail mechanism 300 are different from each other. That is to say, the first rail mechanism 200a and the second rail mechanism 300 can primarily support loads in directions that are different from each other. Accordingly, the up-down direction component and the width direction component of the rotational moment load can be stably supported by the first rail mechanism 200a and the second rail mechanism 300. As a result, the supporting rigidity regarding the movable body 130a is improved.

More specifically, the second rail mechanism 300 is disposed at a position above the movable body 130a, and primarily supports the load component in the up-down direction of the load moment applied to the movable body 130a. The first rail mechanism 200a is disposed at a different position from the movable body 130a in the width direction, and primarily supports the load component in the width direction of the above load. That is to say, out of the load moment applied to the shaft member 121, the load component in the up-down direction is primarily supported by the second rail mechanism 300, and the load component in the width direction is primarily supported by the first rail mechanism 200a. This improves the supporting rigidity regarding the movable body 130a, and as a result, the stability of supporting the steering member 110 improves.

As described above, according to the steering device 100a of the present Modification, the steering device is a device that can broaden the space in front of the driver and also stably support the steering member 110, in the same way as with the steering device 100 according to the embodiment.

4-2. Modification 2

The first rail mechanism 200 may be attached to the first rail mechanism 200 with the thickness direction thereof (the direction in which the fixed rail and the moving rail are aligned) in an orientation facing the up-down direction (Z axial direction) of the vehicle. In this case as well, the contact angle α with respect to the first rolling elements 251 in the first rail mechanism 200 and the contact angle β with respect to the second rolling elements 351 in the second rail mechanism 300 are different from each other. Thus, stability in supporting the movable body 130 is more reliably ensured. Specifically, details are as follows.

Figure 12:
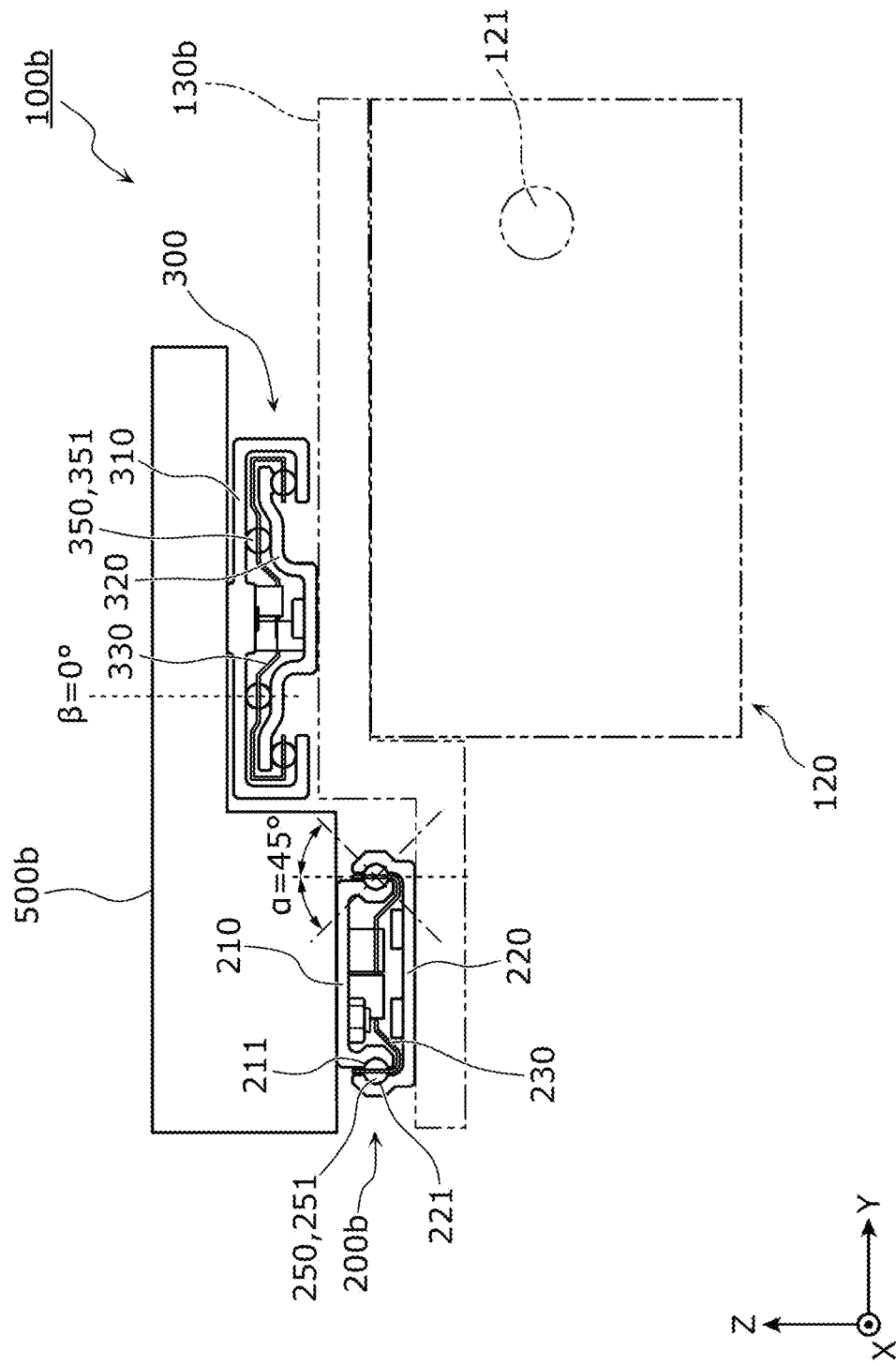
FIG. 12 is a rear view of a steering device according to Modification 2 of the embodiment.

FIG. 12 is a diagram (rear view) of a steering device 100b according to Modification 2 of the embodiment, in a case of viewing from the driver's side. In the present Modification, a movable body 130b is supported by a first rail mechanism 200b and the second rail mechanism 300 that are disposed at different positions from each other, as illustrated in FIG. 12. The first rail mechanism 200b is the first rail mechanism 200 according to the embodiment that has been rotated 90° clockwise about an axis parallel to the X axial direction. That is to say, the first rail mechanism 200b according to the present Modification has the same structure as the first rail mechanism 200 according to the embodiment, and also is disposed in an orientation with the thickness direction thereof facing the up-down direction (Z axial direction). The first rail mechanism 200b disposed in such an orientation is fixed to the movable body 130b and the bracket 500b in a state of being interposed between the movable body 130b and the bracket 500b in the up-down direction (Z axial direction).

In the steering device 100b configured in this way, the contact angle α of each of the plurality of first rolling elements 251 with respect to the first raceway faces 211 and the second raceway faces 221, and the contact angle β of each of the plurality of second rolling elements 351 with respect to the third raceway faces 311 and the fourth raceway faces 321, are different from each other. This is common to the steering device 100 according to the embodiment. Specifically, as described above, in the first rail mechanism 200 according to the embodiment, the contact angle α corresponding to each of the four points of contact on the first rolling elements 251 is 45° (see FIG. 9). Accordingly, even in a case in which the first rail mechanism 200 is rotated 90° about an axis parallel to the X axial direction, the contact angle α corresponding to each of the four points of contact on the first rolling elements 251 is 45°. That is to say, the contact angle α of the first rolling elements 251 in the present Modification is 45°. Further, the contact angle β of the second rolling elements 351 in the second rail mechanism 300 is 0°.

According to this configuration, the contact angle α and the contact angle β are different from each other, and accordingly the respective primary load supporting directions of the first rail mechanism 200b and the second rail mechanism 300 are different from each other. That is to say, the first rail mechanism 200b and the second rail mechanism 300 can primarily support loads in directions that are different from each other. Accordingly, the up-down direction component and the width direction component of the rotational moment load can be stably supported by the first rail mechanism 200b and the second rail mechanism 300. As a result, the supporting rigidity regarding the movable body 130b is improved.

More specifically, the second rail mechanism 300 is disposed at a position above the movable body 130b, and primarily supports the load component in the up-down direction of the load moment applied to the movable body 130b. The first rail mechanism 200b is disposed at a different position from the movable body 130b in the width direction, and primarily supports the load component in the width direction of the above load. That is to say, out of the load moment applied to the shaft member 121, the load component in the up-down direction is primarily supported by the second rail mechanism 300, and the load component in the width direction is primarily supported by the first rail mechanism 200*b*. This improves the supporting rigidity regarding the movable body 130*b*, and as a result, the stability of supporting the steering member 110 improves.

As described above, according to the steering device 100*b* of the present Modification, the steering device is a device that can broaden the space in front of the driver and also stably support the steering member 110, in the same way as with the steering device 100 according to the embodiment.

4-3. Modification 3

The respective positions of the first rail mechanism 200 and the second rail mechanism 300 in the up-down direction (Z axial direction) of the vehicle may be the same or may overlap. In this case as well, the contact angle α with respect to the first rolling elements 251 in the first rail mechanism 200 and the contact angle β with respect to the second rolling elements 351 in the second rail mechanism 300 are different from each other. Thus, stability in supporting the movable body 130 is more reliably ensured. Specifically, details are as follows.

Figure 13:
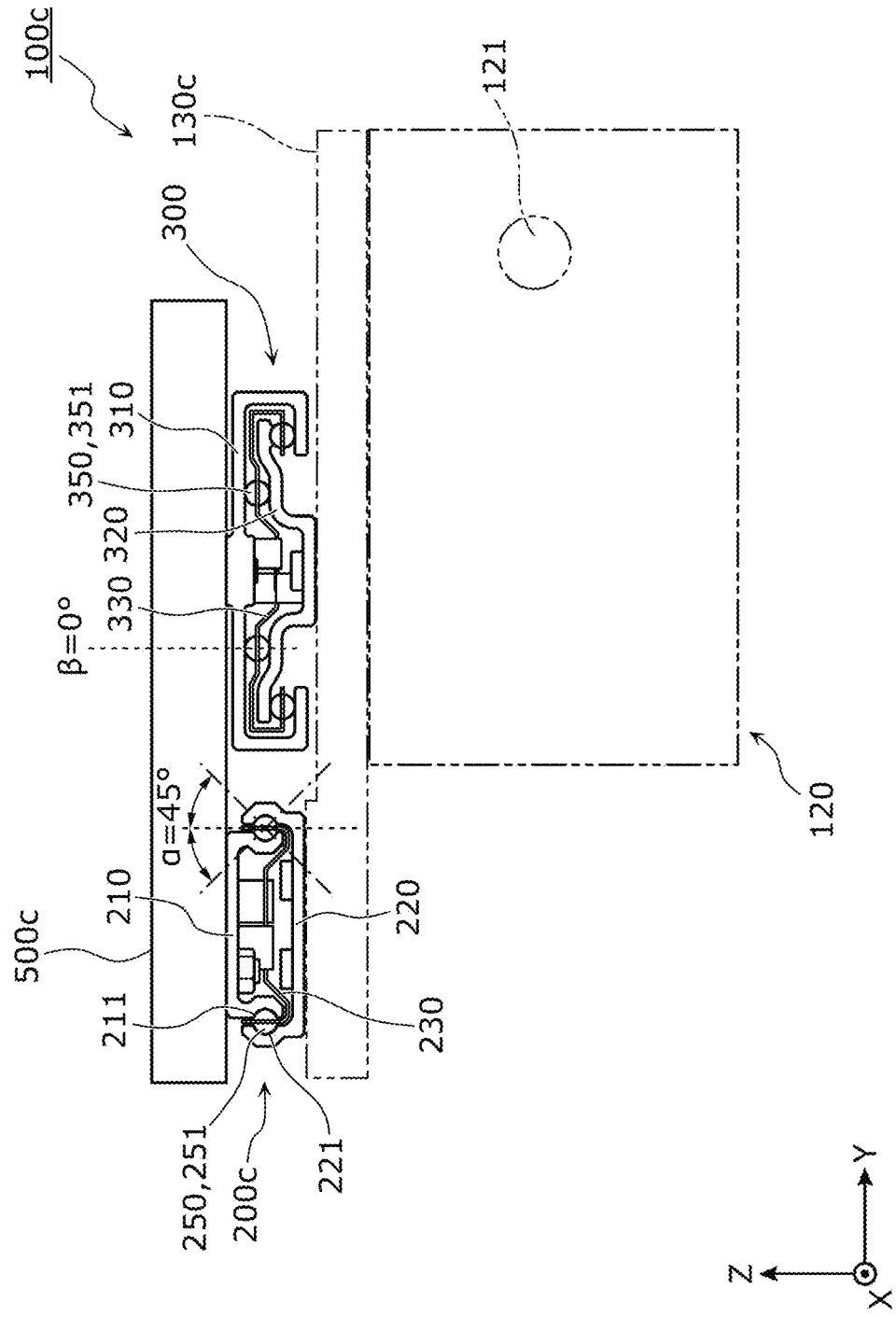
FIG. 13 is a rear view of a steering device according to Modification 3 of the embodiment.

FIG. 13 is a diagram (rear view) of a steering device 100*c* according to Modification 3 of the embodiment, in a case of viewing from the driver's side. In the present Modification, a movable body 130*c* is supported by a first rail mechanism 200*c* and the second rail mechanism 300 that are disposed at different positions from each other, as illustrated in FIG. 13. The first rail mechanism 200*c* has the same structure as the first rail mechanism 200 according to the embodiment, and also is disposed in an orientation rotated 90° clockwise about an axis parallel to the X axis. That is to say, the first rail mechanism 200*c* according to the present Modification has the same structure as the first rail mechanisms 200 and 200*b*, and also is disposed in the same orientation as the first rail mechanism 200*b*. Accordingly, the contact angle α of the first rolling elements 251 in the present Modification is 45°, in the same way as with the embodiment and Modification 2.

The first rail mechanism 200*c* according to the present Modification is disposed at the same position as the second rail mechanism 300 in the up-down direction (Z axial direction) of the vehicle, and with respect to this point, differs from the first rail mechanism 200 according to the embodiment and the first rail mechanism 200*b* according to Modification 2. More specifically, in the present Modification, the first fixed rail 210 of the first rail mechanism 200*c* and the second fixed rail 310 are fixed to a lower face of a bracket 500*c* that is parallel to the XY plane. As a result, the first rail mechanism 200*c* and the second rail mechanism 300 are disposed so that the respective upper end portions thereof (end portions in the positive Z axis direction) agree. As a result, the first rail mechanism 200*c* is located at a position arrayed with the second rail mechanism 300 in the width direction (Y axial direction) of the vehicle, and also disposed at a position higher than the movable body 130*c* in the up-down direction (Z axis direction) of the vehicle.

In the steering device 100*c* configured in this way, the contact angle α of each of the plurality of first rolling elements 251 with respect to the first raceway face 211 and the second raceway face 221, and the contact angle β of each of the plurality of second rolling elements 351 with respect to the third raceway face 311 and the fourth raceway face 321, are different from each other. This is common to the steering device 100 according to the embodiment. Specifically, as illustrated in FIG. 13, the contact angle α for the first rolling elements 251 is 45°, and the contact angle β for the second rolling elements 351 is 0°.

According to this configuration, the contact angle α and the contact angle β are different from each other, and accordingly the respective primary load supporting directions of the first rail mechanism 200*c* and the second rail mechanism 300 are different from each other. That is to say, the first rail mechanism 200*c* and the second rail mechanism 300 can primarily support loads in directions that are different from each other. Accordingly, the up-down direction component and the width direction component of the rotational moment load can be stably supported by the first rail mechanism 200*c* and the second rail mechanism 300. As a result, the supporting rigidity regarding the movable body 130*c* is improved.

More specifically, the second rail mechanism 300 is disposed at a position above the movable body 130*c*, and primarily supports the load component in the up-down direction of the load moment applied to the movable body 130*c*. The first rail mechanism 200*c* is disposed at a different position from the movable body 130*c* in the width direction, and primarily supports the load component in the width direction of the above load. That is to say, out of the load moment applied to the shaft member 121, the load component in the up-down direction is primarily supported by the second rail mechanism 300, and the load component in the width direction is primarily supported by the first rail mechanism 200*c*. This improves the supporting rigidity regarding the movable body 130*c*, and as a result, the stability of supporting the steering member 110 improves.

As described above, according to the steering device 100*c* of the present Modification, the steering device is a device that can broaden the space in front of the driver and also stably support the steering member 110, in the same way as with the steering device 100 according to the embodiment.

5. Other Modifications

The steering device according to the present invention has been described above based on the embodiment and modifications thereof. However, the present invention is not limited to the above embodiment and modifications. The scope of the present invention also encompasses various modifications that would be conceivable by those skilled in the art applied to the above-described embodiment or modifications, or forms constructed by combining a plurality of the above-described components, without departing from the spirit of the present invention.

For example, it is sufficient for the number of rolling element rows that each of the first rail mechanism 200 and the second rail mechanism 300 has to be one or more. That is to say, the first rail mechanism 200 can cause the first moving rail 220 to slide with respect to the first fixed rail 210 as long as it has at least one first rolling element row 250. In the same way, the second rail mechanism 300 can also cause the second moving rail 320 to slide with respect to the second fixed rail 310 as long as it has at least one second rolling element row 350. For example, the second rail mechanism 300 may have just one second rolling element row 350 between the inner face of the second fixed rail 310 and an upper face of the second moving rail 320. That is to say, the number of second rolling element rows 350 in the second rail mechanism 300 may be three. In this case, the second rolling element row 350 disposed along the upper face of the second moving rail 320 is preferably disposed at the middle portion of the second fixed rail 310 and the second moving rail 320 in the Y axial direction, from the viewpoint of realizing stable sliding action of the second moving rail 320. The number of rolling element rows that the first rail mechanism 200 and the second rail mechanism 300 have may be determined as appropriate in accordance with, for example, the specifications required for the first rail mechanism 200 and the second rail mechanism 300 (necessary extending/collapsing length, weight or size of members to be supported (movable body 130, column unit 120, or the like)).

The first rolling elements 251 and the second rolling elements 351 may be different types of rolling elements from bearing balls. For example, bearing rollers may be employed as at least one of the first rolling elements 251 and the second rolling elements 351. The material that the first rolling elements 251 and the second rolling elements 351 are made of is not limited to metal. At least one of the first rolling elements 251 and the second rolling elements 351 may be made of resin, for example.

The rail mechanisms included in the steering device 100 do not need to be limited to just the first rail mechanism 200 and the second rail mechanism 300. For example, a third rail mechanism connected to the movable body 130 may be disposed on the right side of the movable body 130 in FIG. 6. In this case, the third rail mechanism may be fixed to the vehicle via the bracket 500 or some other member, or may be fixed directly to the vehicle. That is to say, it is sufficient for the steering device 100 to include at least the first rail mechanism 200 and the second rail mechanism 300 as rail mechanisms that support the movable body 130 so as to be capable of moving in the front-rear direction. For example, in a case in which the size or weight of the movable body 130 and the column unit 120 is relatively great, the steering device 100 may further include a rail mechanism.

The first rail mechanism 200 and the second rail mechanism 300 may have an intermediate rail disposed between the fixed rail and the moving rail, and also disposed to be slidable with respect to each of the fixed rail and the moving rail. As a result, the extendable/collapsible lengths of the first rail mechanism 200 and the second rail mechanism 300 increase.

The first rail mechanism 200 and the second rail mechanism 300 do not have to be spaced apart in the width direction (Y axial direction) of the vehicle. That is to say, the first rail mechanism 200 and the second rail mechanism 300 may be disposed in contact with each other in the width direction of the vehicle. For example, the distance between the first rail mechanism 200 and the second rail mechanism 300 in the width direction of the vehicle may be determined in accordance with the sizes of the movable body 130 and the column unit 120 in the width direction of the vehicle.

The steering device 100 may further include a tilt mechanism unit that changes inclination of the steering device 100 in the up-down direction. The tilt mechanism unit changes inclination of the bracket 500 in the up-down direction, for example. Accordingly, the position of the steering member 110 in the up-down direction can be adjusted in accordance with the will of the driver.

The drive device 140 may drive the movement of the movable body 130 using a method different from the feed screw method. The drive device 140 may drive the movement of the movable body 130 in the front-rear direction by, for example, extending/collapsing of a rod fixed to the movable body 130, or front-rear direction movement thereof. Furthermore, the steering device 100 does not have to include the drive device 140. For example, the driver may manually execute movement of the steering member 110 to advance and retreat, i.e., move the movable body 130 between the normal position and the stored position. In this case as well, according to the steering device 100 of the present embodiment, moving of the steering member 110 is executed to advance and retreat in a state in which the steering member 110 is stably supported.

The movable body 130 does not need to be a separate member from the column unit 120. For example, in a case in which the reaction force generation device 125 included in the column unit 120 has a base, the base may function as the movable body 130 that moves in the front-rear direction while being guided by the first rail mechanism 200 and the second rail mechanism 300.

The movable body 130 may stop at a position different from the normal position (see FIG. 2) and the stored position (see FIG. 4 and FIG. 5). For example, the drive device 140 may be controlled so that the movable body 130 stops at any position (intermediate position) between the normal position and the stored position. For example, in a case in which the movable body 130 is in an intermediate position during a period in which the vehicle is moving in the automated driving mode, the steering member 110 supported by the movable body 130 via the shaft member 121 is positioned further forward than the position when in the manual driving mode. Accordingly, the space in front of the driver is made to be broader than the space in front of the driver in the manual driving mode. Furthermore, in a case in which some sort of incident occurs while the vehicle is moving in the automated driving mode, the driver can immediately operate the steering member 110.

INDUSTRIAL APPLICABILITY

The present invention is useful as a steering device which can broaden space in front of a driver. Accordingly, it can be used for vehicles equipped with wheels, caterpillar track, or the like, such as passenger cars, buses, trucks, agricultural machines, construction machines, and so forth, which are capable of manual driving and also capable of automated driving.

DESCRIPTION OF THE REFERENCE NUMERALS

10 Steering system
100, 100a, 100b, 100c Steering device
102 Steering operation mechanism unit
110 Steering member
110a Hub portion
110b Grasping portion
120 Column unit
121 Shaft member
125 Reaction force generation device
126 Shaft support portion
127 Reaction force motor
130, 130a, 130b, 130c Movable body
131 Main body portion
134: Nut portion
140 Drive device
141 Movement actuator
142: Transmission mechanism unit
145 Feed screw
200, 200a, 200b, 200c First rail mechanism
210, 210a First fixed rail
211, 211a First raceway face
215, 216 First fixed stopper
220, 220a First moving rail
221, 221a Second raceway face 225, 226 First moving stopper
230, 230a, 330 Retainer
231a First rolling element pocket
231b Spacer pocket
250 First rolling element row
251 First rolling element
251a, 351a Spacer
300 Second rail mechanism
310 Second fixed rail
311 Third raceway face
315, 316 Second fixed stopper
320 Second moving rail
321 Fourth raceway face
325, 326 Second moving stopper
331 Second rolling element pocket
350 Second rolling element row
351 Second rolling element
500, 500a, 500b, 500c Bracket
510 Attaching member
520 Shaft support member
710 Steered wheel
711 Tie rod
730 Shaft body
750 Steering actuator

The invention claimed is:

1. A steering device for performing steering of a vehicle, the steering device comprising:
  a steering input shaft to which a steering member is attached;
  a movable body that rotatably supports the steering input shaft; and
  a first rail mechanism and a second rail mechanism that guide movement of the movable body in a front-rear direction of the vehicle, the first rail mechanism and the second rail mechanism being disposed at different positions from each other, wherein
  the first rail mechanism includes
    a first fixed rail that is fixed to the vehicle and that has a first raceway face,
    a first moving rail that is slidably attached to the first fixed rail, and that has a second raceway face, and also that is attached to the movable body, and
    a first rolling element row that is disposed between the first raceway face and the second raceway face, the first rolling element row including a plurality of first rolling elements that are capable of rolling,
  the second rail mechanism includes
    a second fixed rail that is fixed to the vehicle and that has a third raceway face,
    a second moving rail that is slidably attached to the second fixed rail, and that has a fourth raceway face, and also that is attached to the movable body, and
    a second rolling element row that is disposed between the third raceway face and the fourth raceway face, the second rolling element row including a plurality of second rolling elements that are capable of rolling, and
  a contact angle of each of the plurality of first rolling elements with respect to the first raceway face and the second raceway face, and a contact angle of each of the plurality of second rolling elements with respect to the third raceway face and the fourth raceway face, are different from each other.

2. The steering device according to claim 1, wherein
  the first rail mechanism is disposed at a position that is different from the movable body in a width direction of the vehicle, and
  the second rail mechanism is disposed at a position upward from the movable body in an up-down direction of the vehicle.

3. The steering device according to claim 2, wherein
  a total number of points of contact of each of the plurality of first rolling elements with respect to the first raceway face and the second raceway face is three or more, and
  a total number of points of contact of each of the plurality of second rolling elements with respect to the third raceway face and the fourth raceway face is two.

4. The steering device according to claim 1, wherein the first rail mechanism and the second rail mechanism are disposed spaced apart from each other in a width direction of the vehicle.

5. The steering device according to claim 1, wherein the second rail mechanism is disposed at a position that is upward from the steering input shaft in an up-down direction of the vehicle, and also at a position that is not directly above the steering input shaft.

* * * * *